(12) United States Patent  
Heap

(10) Patent No.: US 6,584,759 B1
(45) Date of Patent: Jul. 1, 2003

(54) ENGINE

(76) Inventor: Roland Grant Heap, 5 Church Path, Clophill, Bedford MK45 4BP (GB)

(*) Notice: Subject to any disclaimer, the term of this patent is extended or adjusted under 35 U.S.C. 154(b) by 0 days.

(21) Appl. No.: 09/856,129
(22) PCT Filed: Nov. 19, 1999
(86) PCT No.: PCT/GB99/03844
§ 371 (c)(1),
(2), (4) Date: Aug. 22, 2001
(87) PCT Pub. No.: WO00/31394
PCT Pub. Date: Jun. 2, 2000

(30) Foreign Application Priority Data

Nov. 21, 1998 (GB) .............................. 9825504

(51) Int. Cl.⁷ ................................. F02C 3/04
(52) U.S. Cl. ....................... 60/39.44; 60/805
(58) Field of Search ................ 60/39.44, 805; 415/52.1, 55.6, 58.6

(56) References Cited

U.S. PATENT DOCUMENTS

| 1,076,733 | A | * | 10/1913 | Anderson | 415/46 |
| 1,546,049 | A | * | 7/1925 | Wait | 415/52.1 |
| 1,582,174 | A | * | 4/1926 | Gallaher | 415/57.4 |
| 2,444,213 | A |   | 6/1948 | Weeks |   |
| 3,397,864 | A | * | 8/1968 | Sprouse | 415/57.4 |
| 5,966,927 | A | * | 10/1999 | Wilson | 60/39.43 |

FOREIGN PATENT DOCUMENTS

| DE | 1 601 582 | 1/1970 |
| FR | 376.792 | 9/1908 |
| FR | 801.662 | 8/1936 |
| FR | 977.740 | 4/1951 |
| FR | 1.192.930 | 10/1959 |

OTHER PUBLICATIONS

International Search Report for International Application PCT/GB 99/03844.
English translation of French Patent No. 1.192.930 dated Oct., 1959.
English translation of French Patent No. 977.740 dated Apr., 1951.
English translation of German Patent No. 1 601 582 dated Jan., 1970.
English translation of French Patent No. 801.662 dated Aug., 1936.
English translation of French Patent No. 376.792 dated Sep., 1908.

* cited by examiner

Primary Examiner—Ehud Gartenberg
(74) Attorney, Agent, or Firm—Fay, Sharpe, Fagan, Minnich & McKee, LLP

(57) ABSTRACT

An engine is disclosed that incorporates components purely or predominantly rotational components. An engine including a rotor and a stator, in which a combustion chamber is defined in the stator and a fluid receiving chamber is defined in the rotor, in which combustion gas can expand from the combustion chamber into the receiving chamber, whereby momentum is transferred from the combustion gas to the rotor.

44 Claims, 38 Drawing Sheets

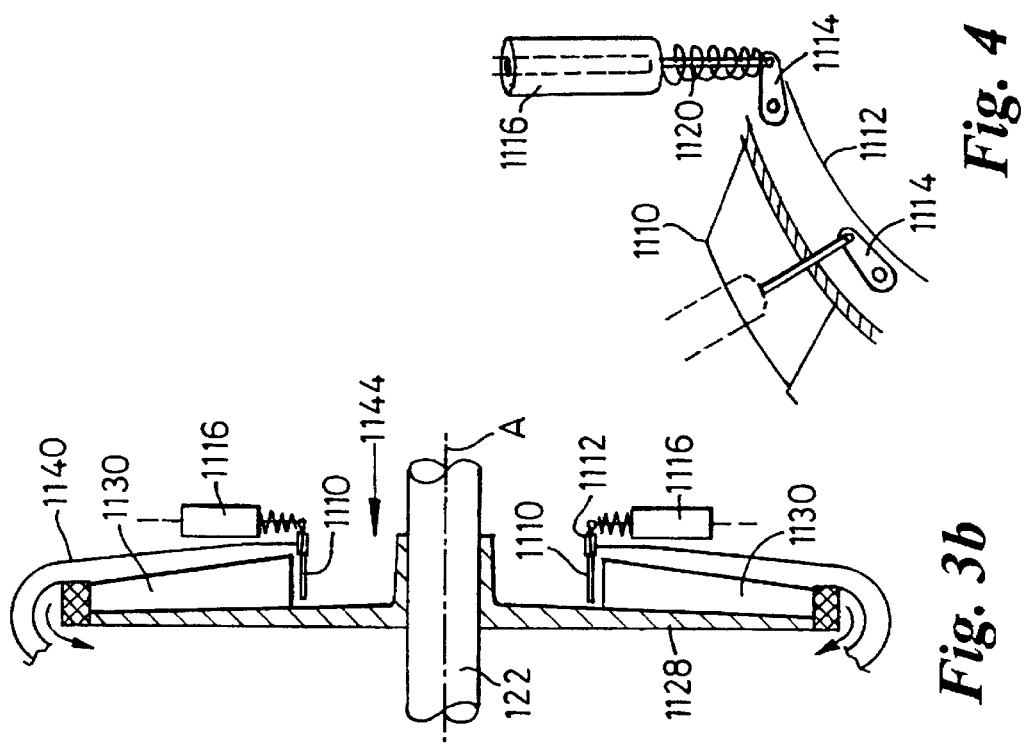
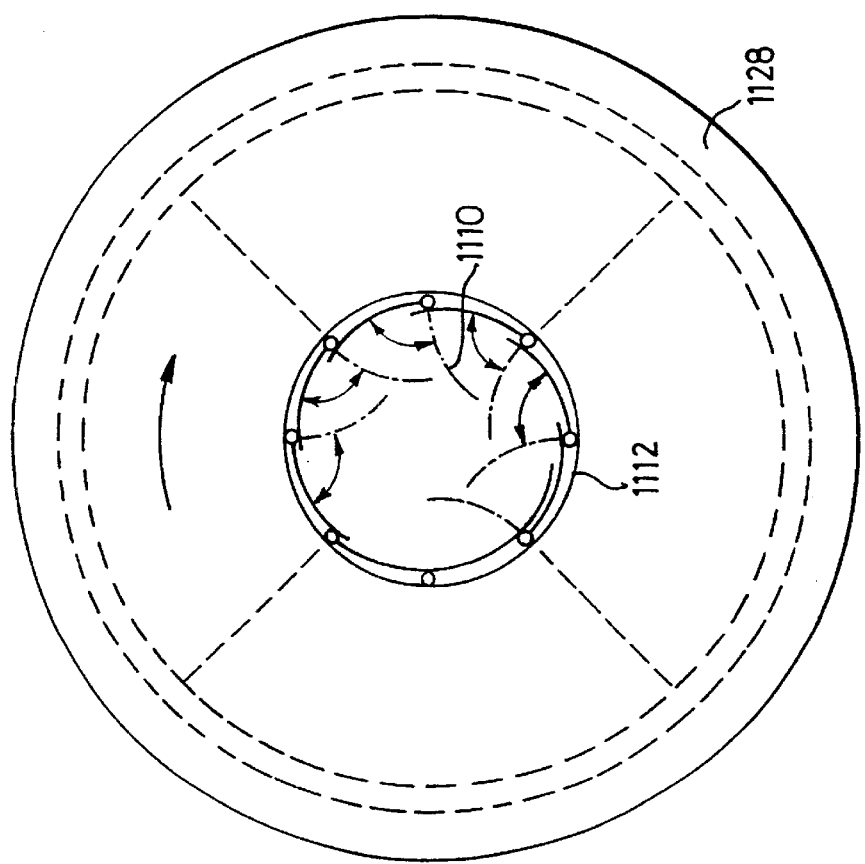
*Fig. 4*
*Fig. 3b*
*Fig. 3a*

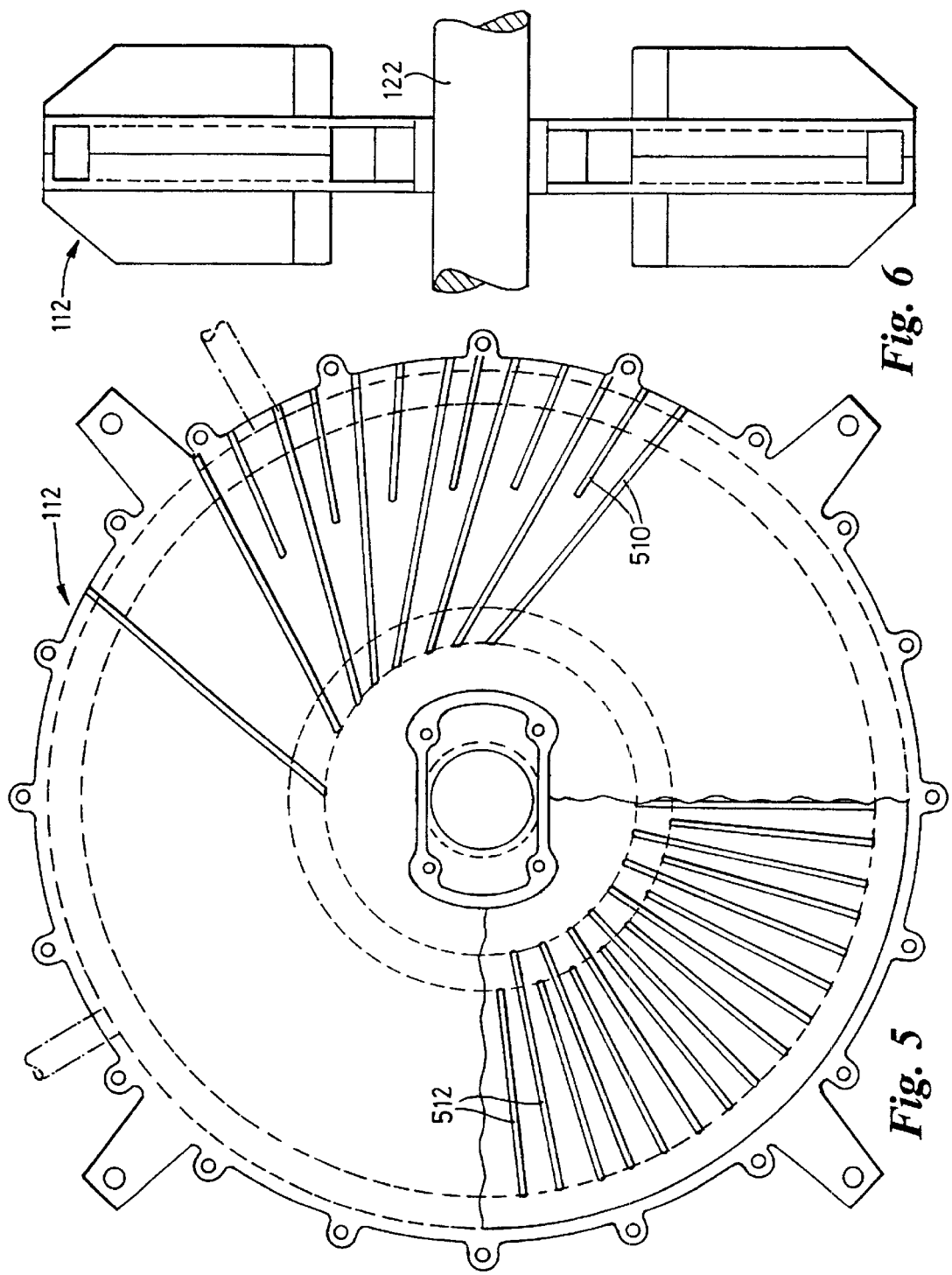

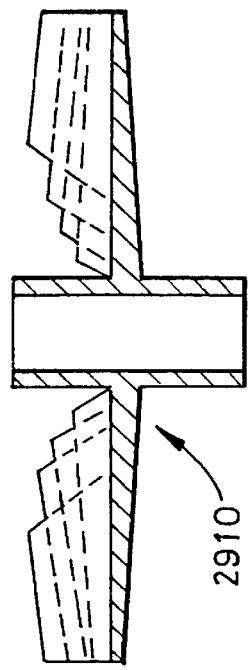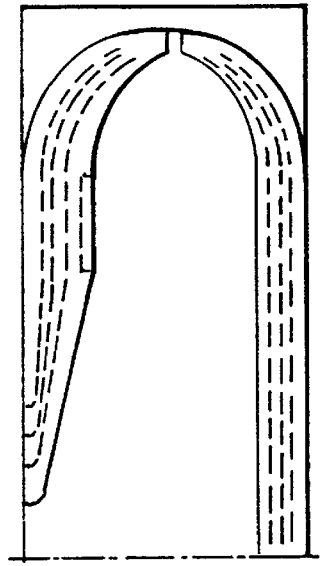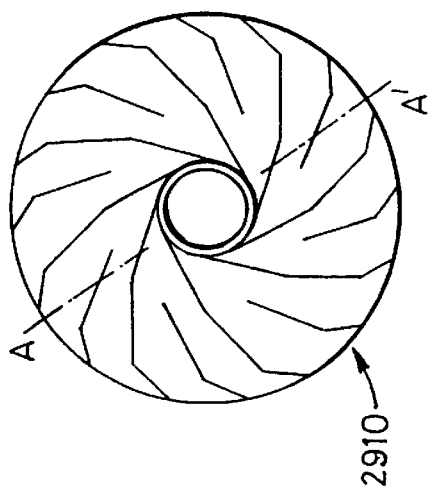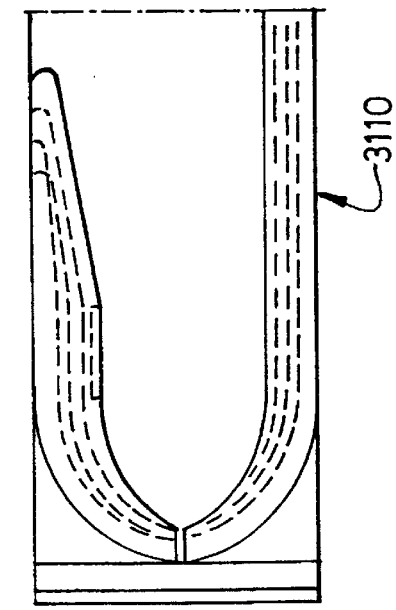
Fig. 30
Fig. 31
Fig. 29

$\{C_1, (T_1 + T_2)\}$ $\{C_1 . C_3, (T_1 + T_2) . T_3\}$ $\{C_3 . C_1, (T_1 + T_2) . T_3\}$ $\{C_4 . C_1 . C_3, (T_1 + T_2) . T_3 . T_4\}$

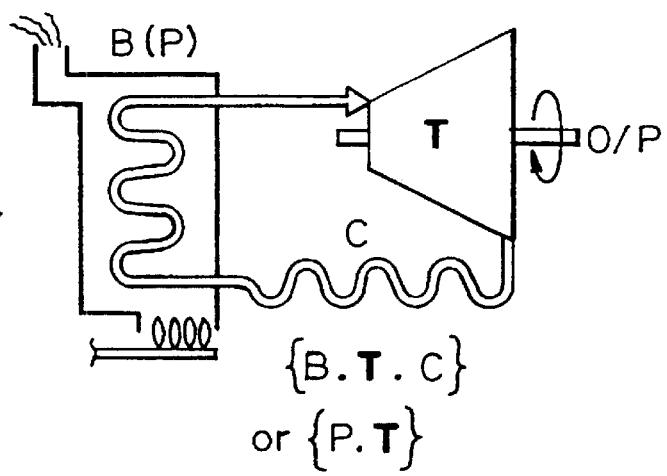
*Fig. 57*
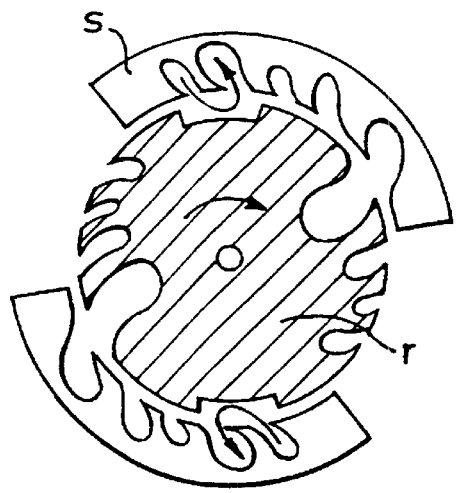 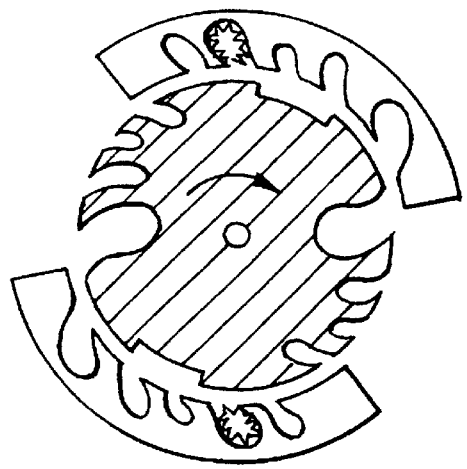
*Fig. 58a*   *Fig. 58b*
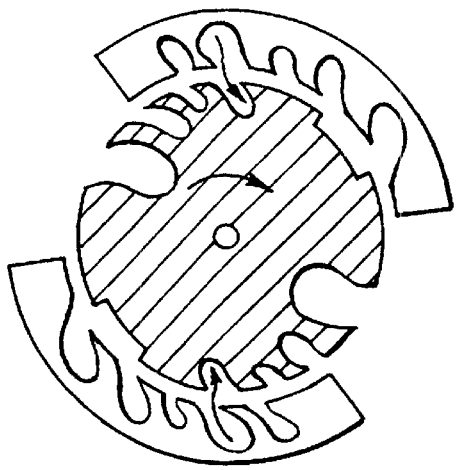 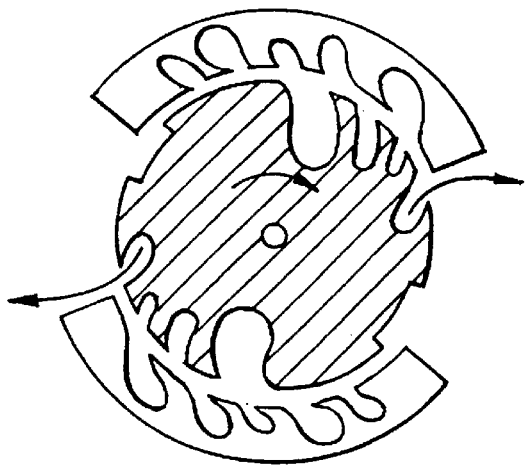
*Fig. 58c*   *Fig. 58d*

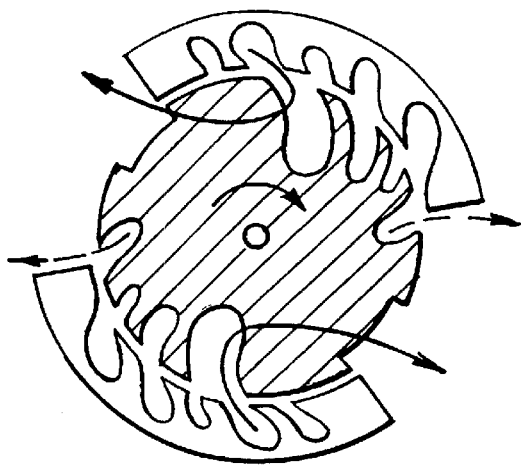
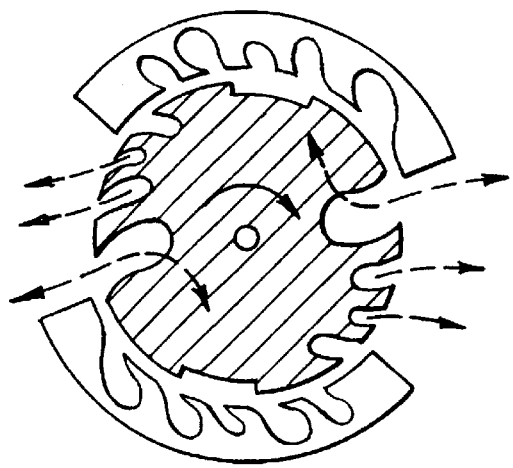
*Fig. 58e*   *Fig. 58f*
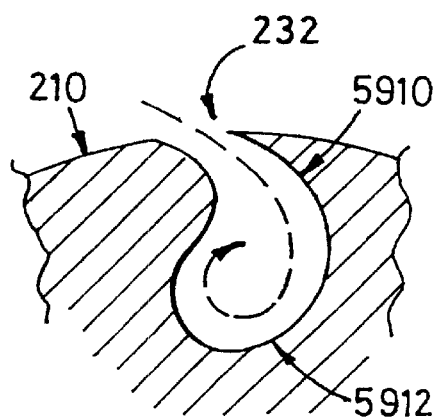
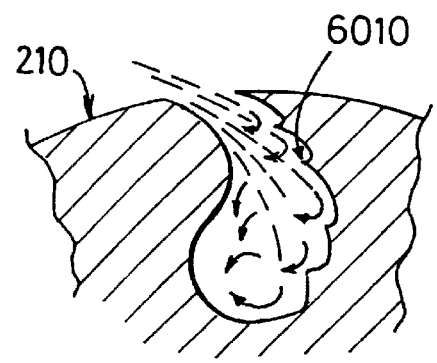
*Fig. 59*   *Fig. 60*

Fig. 63

Table 1)
Pressure in lbs/sq"

| Ref Step | s1 | s2 | s3 | s4 | s5 | s6 | s7 | s8 | s9 | s10 | s11 | s12 | s13 |
|---|---|---|---|---|---|---|---|---|---|---|---|---|---|
| 0 | 15 | 15 | 15 | 15 | 15 | 15 | 15 | 15 | 15 | 15 | 15 | 15 | 15 |
| 1 | 2000 | 15 | 15 | 15 | 15 | 15 | 15 | 15 | 15 | 15 | 15 | 15 | 15 |
| 2 | 1552 | 15 | 15 | 15 | 15 | 15 | 15 | 15 | 15 | 15 | 15 | 15 | 15 |
| 3 | 1490 | 1464 | 15 | 15 | 15 | 15 | 15 | 15 | 15 | 15 | 15 | 15 | 15 |
| 4 | 1393 | 1480 | 1311 | 15 | 15 | 15 | 15 | 15 | 15 | 15 | 15 | 15 | 15 |
| 5 | 1268 | 1415 | 1393 | 1115 | 15 | 15 | 15 | 15 | 15 | 15 | 15 | 15 | 15 |
| 6 | 1126 | 1295 | 1406 | 1224 | 901 | 15 | 15 | 15 | 15 | 15 | 15 | 15 | 15 |
| 7 | 951 | 1150 | 1328 | 1321 | 1008 | 661 | 15 | 15 | 15 | 15 | 15 | 15 | 15 |
| 8 | 804 | 970 | 1192 | 1325 | 1153 | 748 | 485 | 15 | 15 | 15 | 15 | 15 | 15 |
| 9 | 663 | 820 | 1007 | 1234 | 1248 | 896 | 552 | 342 | 15 | 15 | 15 | 15 | 15 |
| 10 | 517 | 676 | 851 | 1059 | 1239 | 1056 | 678 | 389 | 218 | 15 | 15 | 15 | 15 |
| 11 | 395 | 526 | 701 | 899 | 1111 | 1151 | 849 | 485 | 248 | 135 | 15 | 15 | 15 |
| 12 | 243 | 402 | 545 | 741 | 959 | 1126 | 1007 | 636 | 312 | 154 | 64 | 15 | 15 |
| 13 | 95 | 246 | 415 | 574 | 796 | 1022 | 1081 | 815 | 423 | 193 | 72 | 25 | 15 |
| 14 | 30 | 96 | 253 | 437 | 617 | 873 | 1045 | 970 | 582 | 267 | 89 | 27 | 15 |
| 15 | 15 | 31 | 98 | 265 | 469 | 687 | 932 | 1013 | 777 | 387 | 122 | 30 | 16 |
| 16 | 15 | 15 | 31 | 101 | 282 | 523 | 753 | 963 | 896 | 573 | 183 | 38 | 16 |
| 17 | 15 | 15 | 15 | 32 | 106 | 312 | 581 | 817 | 932 | 728 | 302 | 53 | 16 |
| 18 | 15 | 15 | 15 | 15 | 32 | 115 | 346 | 648 | 861 | 834 | 431 | 89 | 17 |
| 19 | 15 | 15 | 15 | 15 | 15 | 34 | 125 | 390 | 723 | 850 | 567 | 139 | 19 |
| 20 | 15 | 15 | 15 | 15 | 15 | 15 | 35 | 139 | 456 | 771 | 682 | 209 | 25 |
| 21 | 15 | 15 | 15 | 15 | 15 | 15 | 15 | 37 | 162 | 524 | 721 | 307 | 33 |
| 22 | 15 | 15 | 15 | 15 | 15 | 15 | 15 | 15 | 41 | 191 | 598 | 401 | 49 |
| 23 | 15 | 15 | 15 | 15 | 15 | 15 | 15 | 15 | 15 | 47 | 262 | 475 | 79 |
| 24 | 15 | 15 | 15 | 15 | 15 | 15 | 15 | 15 | 15 | 15 | 64 | 342 | 119 |
| 25 | 15 | 15 | 15 | 15 | 15 | 15 | 15 | 15 | 15 | 15 | 15 | 124 | 199 |
| 26 | 15 | 15 | 15 | 15 | 15 | 15 | 15 | 15 | 15 | 15 | 15 | 15 | 261 |

Table 2)

| Item no. | Parameter Description | Design Value |
|---|---|---|
| 1 | Engine configuration | {C1,T1} |
| 2 | Engine capacity in ccs. | 2,400 |
| 3 | Total number of chambers including power exhausts | 28 |
| 4 | Maximum shaft output in KW | 2,000 |
| 5 | Total weight in Kg | 50 |
| 6 | Power to weight ratio in KW per Kg | 40 |
| 7 | Efficiency improvement compared to reciprocal in % | 33.5 |
| 8 | Maximum torque in Newton metres | 265 |
| 9 | Maximum speed in rpm. | 30,000 |
| 10 | Compression ratio | 9.12 |
| 11 | Expansion ratio | 12:1 |
| 12 | Working ratio | 1.32 |
| 13 | Pick up point in rpm | 1,500 |
| 14 | Tick over in rpm | 2,000 |
| 15 | Compressor maximum consumption in KW | 900 |
| 16 | Total possible engine output in KW (turbo assisted) | 2,800 |
| 17 | Maximum mean stator temperature in deg C | 180 |
| 18 | Maximum mean rotor temperature in deg C | 200 |
| 19 | Total radial expansion at 30,000 rpm and 273 deg C in mm | 0.363 |
| 20 | Shaft output in KW @ 400 rps (24,000 rpm) | 1352 |
| 21 | Shaft output in KW @ 300 rps (18,000 rpm) | 707 |
| 22 | Shaft output in KW @ 200 rps (12,000 rpm) | 268 |
| 23 | Shaft output in KW @ 100 rps (6,000 rpm) | 23 |
| 24 | Torque in Newton metres @ 400 rps (24,000 rpm) | 175 |
| 25 | Torque in Newton metres @ 300 rps (18,000 rpm) | 94 |

*Fig. 64*

ENGINE

The present invention relates to an engine.

In particular, the invention relates to an internal or external combustion engine that employs purely or predominantly rotational members.

The majority of internal combustion engines in use today employ reciprocating pistons. However, it is recognised that the presence of reciprocating components imposes a limit upon the maximum speed of operation of an engine. Moreover, the need to contain the forces associated with reciprocating components mandates the use of components of substantial weight. For this reason, attempts have been made to devise engines that employ components having purely or predominantly rotary components. To date, the most successful rotary piston engine is the "Wankel" engine, named after its German inventor. However, this unit although simple, has had limited commercial success due to several reasons. The foremost of these is its reputation for suffering from sealing problems, followed by low torque at low engine speed, fuel inefficiency and relatively high pollution levels. The unit also suffers from the need for careful maintenance and its speed of operation must be limited, if seal failure is to be avoided. Moreover, the piston of a Wankel engine (at least, of the type most commonly used in practice) undergoes motion that is not purely rotary; it also has an oscillatory component, and this leads to residual vibration.

Gas turbine engines are also known. In such engines, expanding combustion gas is caused to impinge upon blades of a rotor, and thereby impart a torque to the rotor. A gas turbine has the advantage that its rotor undergoes purely rotational motion, and it can therefore operate at high speed with a minimum of vibration. However, such engines typically operate efficiently only within a relatively narrow band of engine speeds which renders them unsuited to operation in many circumstances, a most important example of which is as an engine for a motor road vehicle.

An aim of the invention is to provide an engine that has predominantly rotary components, and which overcomes or at least ameliorates some disadvantages of known engines.

From a first aspect, the invention provides an engine including a combustion assembly comprising a rotor and a stator, in which a combustion chamber is defined in the stator and a fluid receiving chamber is defined in the rotor, in which combustion gas can expand from the combustion chamber into the receiving chamber, whereby momentum is transferred from the combustion gas to the rotor.

Such an engine may be embodied with a minimum of components, none of which undergo oscillatory movement.

Such an engine may typically have a plurality of rotor expansion chambers into which combustion gas can expand in turn. Most commonly, the rotor expansion chambers are of different volumes. In particular, the rotor expansion chambers are typically of successively increasing volumes. The combustion chamber is advantageously of volume larger than several of the rotor expansion chambers.

In preferred embodiments, the stator has a plurality of stator expansion chambers into which gas can expand from the chambers of the rotor. Typically, the rotor expansion chambers are of different volumes. In particular, the rotor expansion chambers may be of successively increasing volumes.

In preferred embodiments the rotor has a transfer chamber through which combustion gas can pass into the combustion chamber during a portion of the rotation of the rotor.

An engine embodying the invention may be provided with spark ignition apparatus in association with the combustion chamber for igniting a charge of combustible fluid received therein. Typically, the ignition apparatus includes a spark plug.

In an engine embodying the invention, either one or both of the rotor and stator may be formed from a material that has self-lubricating properties. For example, either the rotor or the stator may be formed from spheroidal graphite iron.

Alternatively or additionally, an engine embodying the invention may have an oil mist injector operative to inject an oil mist into a space between the rotor and the stator. Typically, such an oil mist is injected at a position in advance of the combustion chamber.

An engine embodying the invention may, moreover, have a lubricating brush to add lubricating material such as graphite between the stator and the rotor.

In one class of embodiments of an engine, the rotor is shaped as a disc having chambers opening to the periphery of the disc. In such embodiments, the engine preferably has a gap control system for controlling a separation between the rotor and the stator during operation of the engine. Such a gap control system may operate to move the stator radially with respect to the rotor.

In such embodiments, the rotor may comprise a rotor assembly that includes a rotor casting. The rotor casting may be shaped as a disc, having peripheral openings into voids formed therein. The rotor assembly may further comprise end plates secured to the rotor casting to close these voids axially. Several such rotor castings may be assembled together between endplates to provide a combustion assembly of greater combustion capacity, giving rise to a convenient modular form of construction.

In embodiments according to the last-preceding sentence, a spacer may be disposed between adjacent rotor castings to aid in removal of heat from the combustion assembly, and from the rotor castings in particular. The spacer may typically include a through passage in alignment with cooling fluid ducts of the rotor castings.

The stator assemblies may likewise comprise a stator assembly that includes a stator casting. The stator casting may be shaped as a to partially surround the rotor assembly, having openings into voids formed therein. The stator assembly may further comprise end plates secured to the stator casting to close these voids axially. Several such stator castings may be assembled together between endplates to provide a combustion assembly of greater combustion capacity.

In embodiments according to the last-preceding sentence, a spacer may be disposed between adjacent stator castings to aid in removal of heat from the combustion assembly, and from the stator castings in particular. Such a spacer may be formed with holes to link the combustion chambers of the various stator castings in an axial direction. Alternatively, or additionally, combustion mixture may be introduced into each of the combustion chambers.

The optional rotor and/or stator spacer may be provided with fins to remove heat therefrom.

In another class of embodiments, of an engine, the rotor is shaped as a frustum, having chambers opening to its periphery. In such embodiments, the stator typically partially surrounds the rotor. Such embodiments may have a gap control system for controlling a separation between the rotor and the stator during operation of the engine. The gap control system may operate to move the stator axially with respect to the rotor.

In embodiments including a gap control system, the gap control system may include a non-contact sensor. Such a sensor may operate by capacitive sensing, inductive sensing or a combination of capacitive and inductive sensing.

In yet another class of embodiments, the stator are both disc shaped, the combustion chamber being defined between flat faces of the rotor and the stator. In such embodiments, a gap control typically operates to move the stator axially with respect to the rotor.

In embodiments according to either of the last two preceding paragraphs, the rotor and/or the stator may comprise a casting and one or more endplates, as described above.

An engine embodying the invention may further include a compressor for supplying combustion air to the combustion assembly. The compressor may be driven by the rotor. In a convenient construction, the compressor and the rotor may be carried on a common shaft or upon interconnected coaxial shafts. Preferably, an intercooler is disposed between the compressor and the combustion assembly operative to remove heat from the combustion air, and thereby improve volumetric efficiency of the engine.

For spark ignition embodiments, the compressor may deliver combustion air at a pressure in the range of 4 to 7 Bar. Where combustion air charge cooling is provided (for example, in the form of an intercooler) this pressure may be increased to a range of 6 to 12 Bar. In compression-ignition embodiments, the pressure may typically be in the range of 9 to 15 Bar. Where combustion air charge cooling is provided (for example, in the form of an intercooler) this pressure may be increased to a range of 20 to 30 Bar.

In some embodiments, fuel is injected into a stream of combustion air externally of the combustion assembly. Alternatively or additionally, fuel may be injected into a chamber within the combustion assembly.

In addition to fuel and air, water may be introduced into the combustion chamber together with air and fuel. In some of such embodiments, the water may expand as vapour, during combustion, the water vaporises and expands into the receiving chamber and transfers at least some of its momentum to the rotor.

From another aspect, the invention provides a combustion engine including a rotor and a stator, said stator carrying a first set of combustion chambers and said rotor carrying a second set of combustion chambers, the arrangement being such that during operation said rotor rotates relative to said stator and a working fluid is transferred in succession between the combustion chambers of said first and second sets, thereby driving the rotation of the rotor.

By means of this arrangement, the engine can be provided with combustion chambers of a shape and size optimised for a particular intended application. Moreover, the rotor is typically arranged such that its motion is purely rotational, with no oscillatory component.

Important to this engine's success is a novel thermodynamic cycle that is employed in the 'hot' portion of the unit. The engine may have either a single or multistage separate compressor section to achieve compression of the working fluid, which is normally air.

According to a further aspect of the present invention there is provided a combustion engine including a rotor and a stator, said stator carrying a first set of combustion chambers and said rotor carrying a second set of combustion chambers, the arrangement being such that during operation said rotor rotates relative to said stator and a working fluid is transferred in succession between the combustion chambers of said first and second sets, thereby driving the rotation of the rotor.

Advantageously, one or more types of combustion chamber are provided, including one or more of the types referred to hereinafter as 'mother', 'maid' and 'daughter' chambers.

Advantageously, the rotor and/or the stator include a set of daughter chambers that increase progressively in volume.

At least some of the chambers are preferably retort-shaped.

The working fluid is preferably transferred between the chambers by a process referred to hereinafter by the term "Harmonic Gas Fluctuations".

Advantageously, the engine includes a compressor for supplying a combustible mixture of fuel and air to the combustion chambers.

According to a further aspect of the invention there is provided a combustion engine including a rotor and a stator, said engine employing a cadence-recursive expansion process for driving the rotation of the rotor. The cadence-recursive expansion process is described in more detail below.

An engine embodying this invention may be designed to be reliable and may avoid sealing problems by virtue of its high speed of operation and specific design features. It may not suffer from pollution effects or low torque levels. It may also be extremely simple, having (at least theoretically) just one rotating part in its simplest embodiment. Moreover, an engine embodying the invention may have an extremely high specific power output level with low weight, thus providing a power to weight ratio of the same order as the most efficient gas turbines currently available. The output of an engine embodying the invention is typically principally shaft power, not thrust as in a gas turbine unit. Hence it may be suitable to be used for prime moving applications, ranging from all types of road transport to all types of aeronautical applications, including helicopters and VTOL aircraft. It may also be suitable for static power generation, co-generation and marine applications. Due to the combination of rotary action and the unique thermodynamic cycle employed it may be fuel-efficient and because of its extreme simplicity in principle, it may be inexpensive to manufacture.

Throughout this application, comparisons are drawn with comparable reciprocating designs to illustrate points being discussed.

An embodiment of the invention will now be described in detail, and with reference to the accompanying drawings, in which:

FIGS. 3a and 3b are, respectively, front and a part-sectional side view of a modified compressor rotor casing assembly;

FIG. 4 is a perspective view of a component of the rotor casing assembly of FIGS. 3a and 3b;

FIGS. 5, 6 are axial and transverse sectional views of an intercooler being part of the engine of FIG. 1;

FIG. 13 is a section along line A—A in FIG. 12a;

FIG. 29 is an elevational view of an impeller suitable for use in the compressor of FIG. 28;

FIG. 30 is a section along line A–A' of FIG. 29;

FIG. 31 shows a housing being part of the compressor of FIG. 28,

FIGS. 45 to 57 are diagrams of various alternative external configurations of engines embodying the invention;

FIGS. 58a to 58f are diagrammatical cross-sectional views of part of an engine embodying the invention;

FIGS. 59 and 60 show detail design features of expansion chambers in an engine embodying the invention;

FIG. 63 is a table that illustrates an expansion pressure profile;

FIG. 64 is a design performance table;

GENERAL CONFIGURATION

Figure 1:
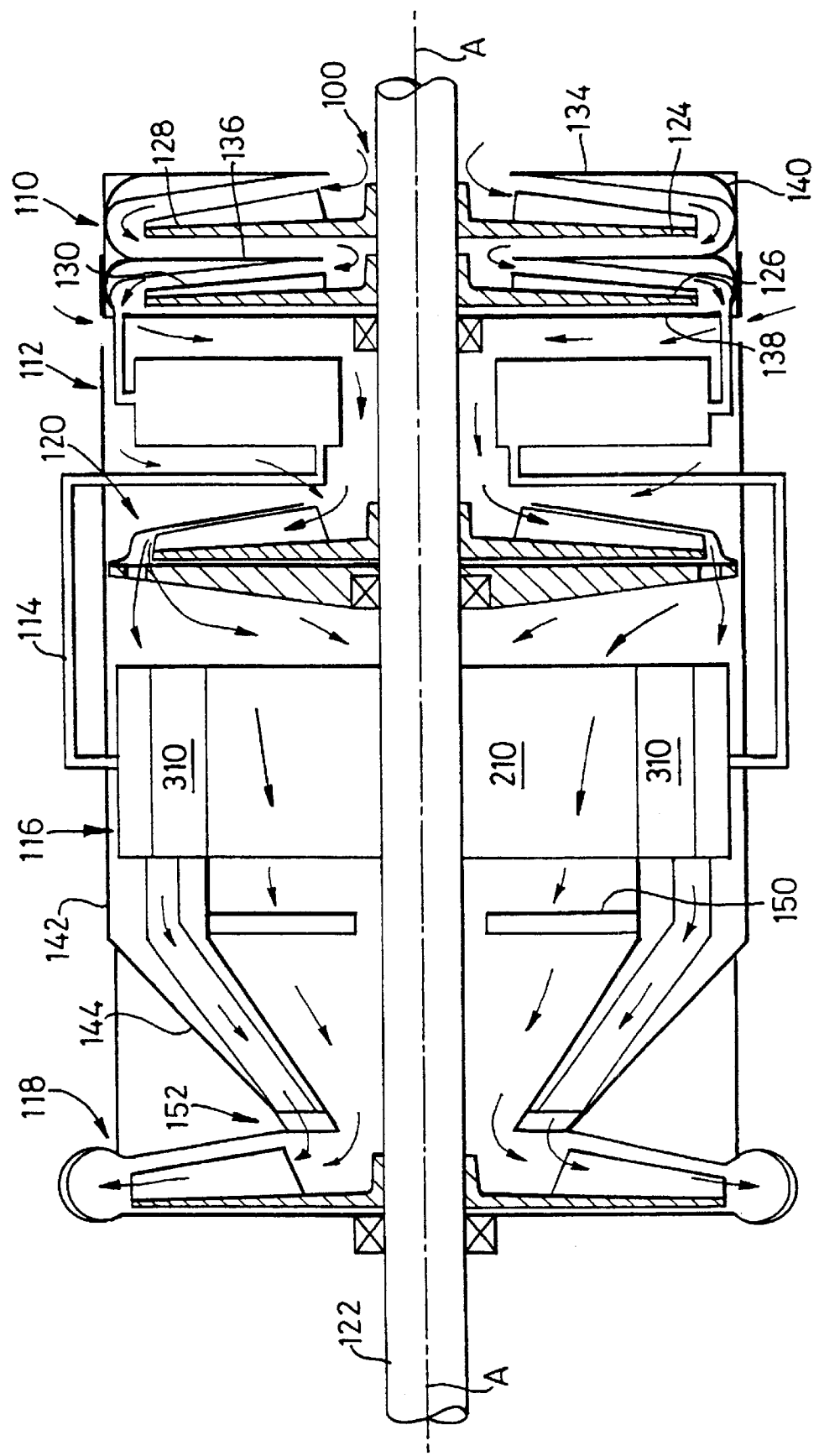
FIG. 1 is a sectional general arrangement drawing of a spark-ignition engine embodying the invention.
Figure 1A:
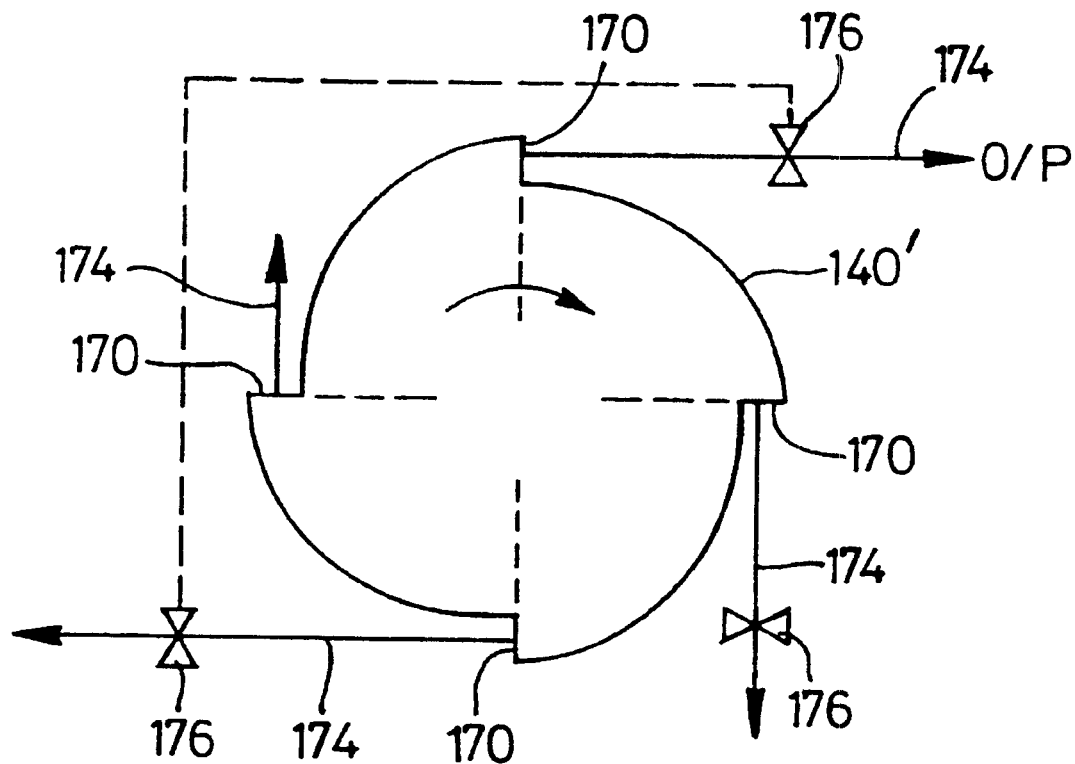
FIG. 1a is a diarammatic axial sectional view of a compressor of the engine of FIG. 1.

With reference first to FIG. 1, an engine embodying the invention has a gas flow path that proceeds generally from right to left in FIG. 1. Combustion air enters the engine at an inlet duct 100, and enters a compressor 110. From there, it proceeds to an intercooler 112, from which it passes through a duct 114 into a combustion assembly 116. Exhaust gasses then leave the combustion assembly 116 (otherwise referred to as "the hot portion") and proceed to an exhaust gas turbine 118 from where they are vented to atmosphere. A flow of cooling air also passes through the intercooler 112, the combustion assembly 116 and then into the turbine 118. Each of these engine components is constructed around a shaft 122, which is carried on bearings for rotation about an engine axis A. A fan 120 is carried on the shaft, in this embodiment between the intercooler 112 and the combustion assembly 116, to drive cooling air through the engine. For convenience, the inlet duct 100 will be said to lie towards the "inlet end" of the engine and the turbine 118 will be said to lie towards the "outlet end" of the engine.

The construction and function of each of these engine components will be described in further detail below.

Air Induction and Compression

Combustion air is compressed externally of the combustion chamber. This is unlike a typical piston internal combustion engine where compression is carried out in a combustion chamber by a piston; in this embodiment, a multi-stage centrifugal compressor 110 carries out compression.

Figure 2A:
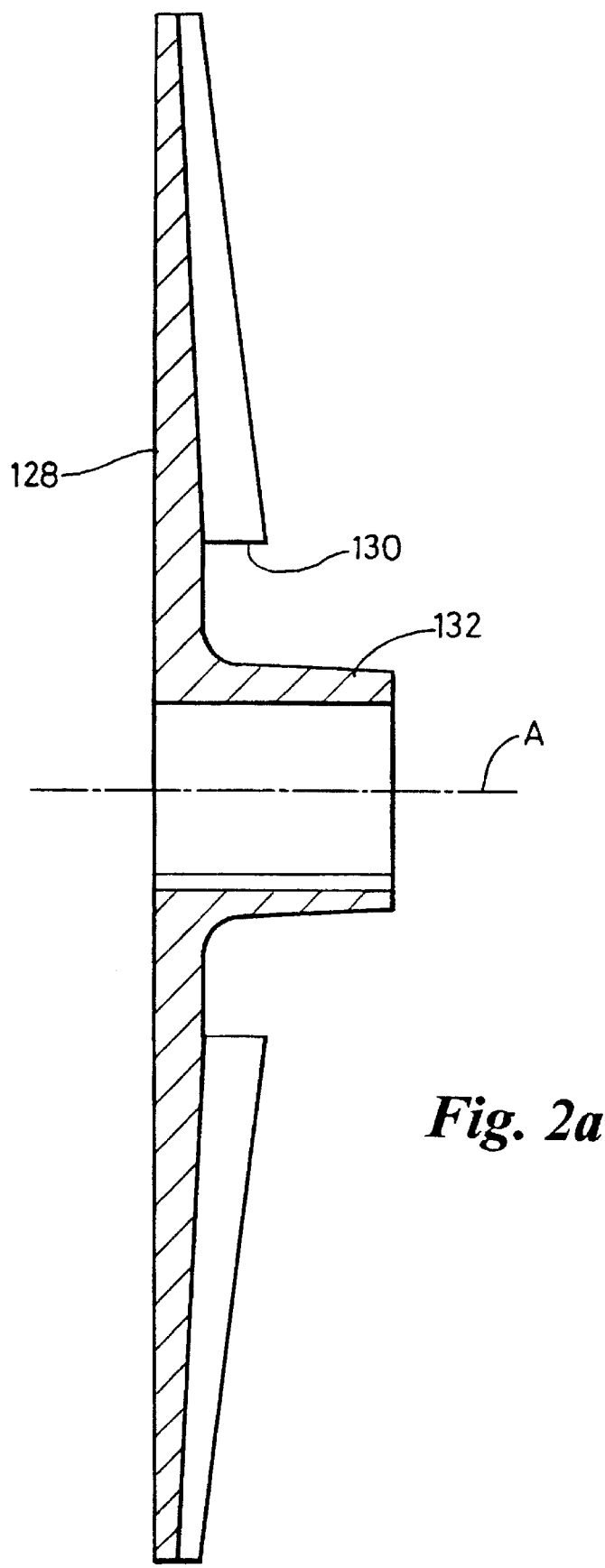
FIGS. 2a and 2b are, respectively, elevational and transverse cross-sectional views of a compressor rotor of the embodiment of FIG. 1.
Figure 2B:
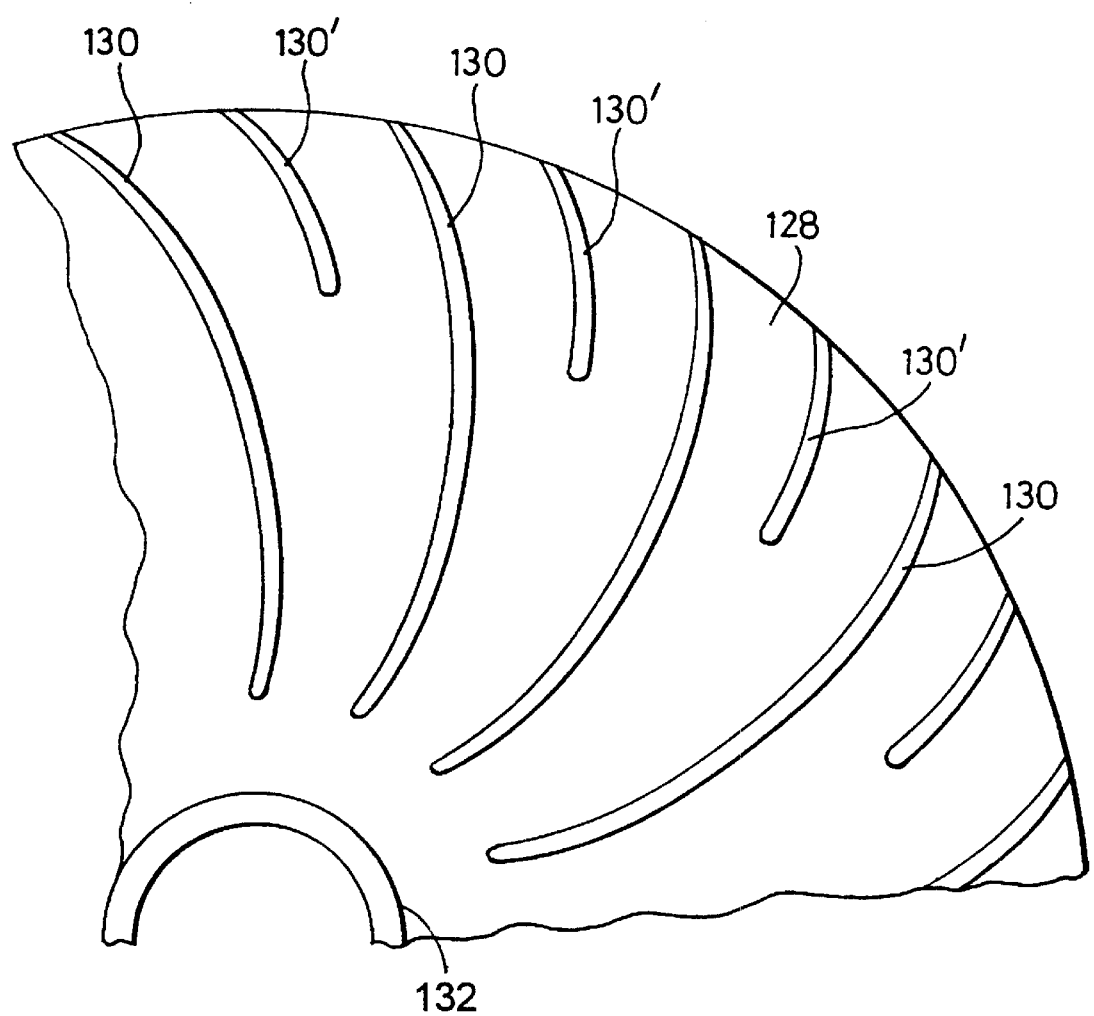

The compressor comprises first and second rotors 124, 126 each carried on the shaft 122 fixed for rotation therewith. A rotor is shown in FIGS. 2a and 2b. Each rotor has a generally annular backplate 128 carried on a boss 132 that is secured to the shaft 122 such that the backplate extends normally to the engine axis A.

A plurality of vanes 130,130' projects from the backplate 128, generally towards the inlet end of the engine. In this embodiment, there are thirty-two vanes in total, the vanes being alternately long 130 and short 130'. FIG. 2b shows the arrangement of several vanes, this arrangement being repeated in equal spacing around the rotor. The long vanes 130 extend from near the boss to the periphery of the backplate 128 while the shorter vanes 130' extend from approximately three-quarters of the radius of the backplate outwardly to the periphery of the backplate. Each vane 130,130' is curved, such that the outer extremity of the vane 130,130' lags behind the inner extremity of the vane when shaft is turning in the direction of normal engine operation.

The precise curve and number of vanes is optimised in each rotor 124,126 being selected to optimise its efficiency at the intended typical speed of operation for any particular engine. The methodologies by which such optimisation can be achieved are well known to those skilled in compressor design.

Each stage of the compressor 110 further comprises a housing within which the rotors 124,126 are contained. At the inlet end, the housing has an annular outer wall 134 that has a central aperture surrounding the shaft 122, the aperture being approximately the diameter of the inner ends of the vanes of the first rotor 124. This aperture constitutes the inlet duct 100. The outer wall 134 lies parallel to the backplate 128 of the first rotor 124, and is spaced from the vanes 130,130'.

The housing further comprises an annular dividing wall 136 that extends between the two rotors 124,126. A central aperture in the dividing wall surrounds the shaft 122.

An inner wall 138 of the housing is disposed at the outlet end of the housing. The inner wall closely surrounds the shaft 122 and a fluid-tight seal is disposed between the inner wall 138 and the shaft 122.

The outer wall 134 and the dividing wall 136 are interconnected around their peripheries by a curved wall section 140, the inner surface of which is concave. This is known as the "volute". The dividing wall 136 and the inner wall 138 are likewise interconnected.

As the shaft 122 spins, the rotors 124,126 spin with it. The vanes of the first rotor 124 drive air radially outwards, drawing air in through the inlet 100 duct. Air driven out from the first rotor impinges upon the curved wall section and is then driven radially inwards between the backplate of the first rotor and the dividing wall 136. From there, the air is drawn through the aperture in the intermediate wall, from where it is once again driven radially outwards by the second rotor 126.

As such, the compressor 100 is, in this embodiment, as a two-stage radial compressor, in this embodiment, with an output pressure of approximately 9.2 Bar.

Additional design considerations can be applied to the compressor in the construction of other embodiments. As is well understood, the flow of air that the compressor 110 should produce is dependent upon the rate at which fuel is consumed in the combustion assembly. In order to meet this requirement, the compressor housing can be constructed from a plurality of similar modules, each module containing a respective rotor. Thus, additional modules can be provided as required to produce a sufficient throughput of air for the combustion of fuel in the combustion assembly 116.

While an engine is operating at a partial or low power output, the amount of air that must be provided in order to support full combustion is less than is the case when the engine is operating at full power. This can lead to inefficiency at partial power, in that the compressor 100 is consuming more power than is actually needed to provide sufficient combustion air. Therefore, one modification is that may be made to the compressor is to restrict the amount of air that can enter or leave the compressor (so reducing aerodynamic drag) under partial-power conditions.

For example, there is shown diagrammatically in FIG. 1 a one possible configuration of the volute of a compressor. The volute has several, in this case four, similar partitions that each increase in radius from the axis A in the direction of rotation of the rotor 124, the partitions being interconnected by a radial wall portion 170. At each of the radial wall portions there is an outlet duct 174 for air that has been compressed within the compressor housing. In this example, one duct 174 is always open to provide a supply of compressed air, while the other outlet ducts 174 each has an associated valve 176 that can be operated to selectively permit or prevent flow in the corresponding duct 174. The valves 176 may be operable individually or several may be interconnected for operation together.

With reference to FIGS. 3a, 3b and 4, an implementation of a scheme whereby an air access path to some of the vanes of a compressor rotor can be obscured to resist ingress of air. In this alternative embodiment, the housing 1140 carries an annular ring 1112 lying in a plane normal to the engine axis A, surrounding the inlet duct 1144, and having a diameter such that it lies close to the inner ends of the vanes 1130. A plurality of closure flaps 1110 is carried on the ring 1112. Each flap 1110 is formed as a thin plate, curved so as to follow an arc centred upon the engine axis A. Close to one of its ends (the later edge of the flap encountered in normal rotational motion of the engine) the flap 1110 is secured to the ring 1112 such that it can pivot about an axis that lies parallel to the engine axis A and adjacent to the circular locus on which lie the ends of the long vanes 1130. At one extreme of its pivotal movement, the flap 1110 extends from the said locus to an end region of an flap 1110, so substantially closing the air passage between adjacent flaps 1110 to the vanes 1130. At the other extreme of its pivotal movement, the flap 1110 projects inwardly from the locus, so opening the air passage. In a preferred arrangement, the flaps extend contiguously for approximately three-quarters of the periphery of the ring 1112.

Movement of the flaps 1110 is controlled by a mechanism shown most clearly in FIG. 4. Each flap has a spigot that extends through the ring 1112, and a crank lever 1114 is carried on the spigot adjacent to the opposite side of the ring 1112. A solenoid actuator 1116 is connected to the crank lever 1114 through a linking rod 1120. Electrical power can be applied to the solenoid actuator 1116 to drive the linking rod 1120 linearly, this linear movement, in turn, effecting pivotal movement of the associated flap 1110 between its extremes of movement. A spring is provided to drive the linking rod 1120 to the position in which the flap 1110 is fully open, this being a fail safe condition, in which the engine will continue to run, in the event of loss of power to the actuators 1116.

The various actuators 1116 are controlled by a control unit to open and close in response to variations in the demand of the combustion assembly 116 for combustion air. One method of controlling the intake of combustion air will be described in detail below.

This arrangement may be more suited for application to control air flow to the first rotor 124 where more space is available at the inlet duct 100 than there is at the aperture in the dividing wall.

Cooling Air Flow

The fan 120 is mounted for rotation with the shaft 122. The fan 120 acts to cause a stream of air to flow axially through the engine to cool various parts of the engine. In particular, the cooling air flows through the intercooler 112 and through the combustion assembly 116.

Upon its exit from the combustion assembly 116, the cooling air flow passes through a louvre assembly 150. The louvre assembly 150 comprises a plurality of louvre-like passages each of which tapers in a V-shaped cross-section in the direction of cooling air flow. This subjects flow of cooling air in the desired direction to an impedance less than in the reverse direction. This arrangement reduces the risk of the cooling air backflushing under pressure from the combustion exhaust gas.

Cooling Combustion Charge

As is well known, forced induction in an engine can give rise to an excessive charge temperature, with undesirable results such as a reduction in volumetric efficiency and a tendency to cause detonation in spark-ignition engines. For this reason, an intercooler 112 is provided to cool the combustion air.

In this embodiment, the intercooler 112 is a toroidal unit through which the combustion air can flow. The intercooler is formed as a metal casting. Internally, the intercooler 112 has a plurality of fins 512 over which the combustion air passes, the fins 512 acting to extract heat from the combustion air. Additionally, there are fins 510 formed on the outside of the intercooler 112, over which the cooling air flows. These external fins 510 act to remove heat from the metal of the intercooler.

Construction of the Combustion Assembly

Figure 7:
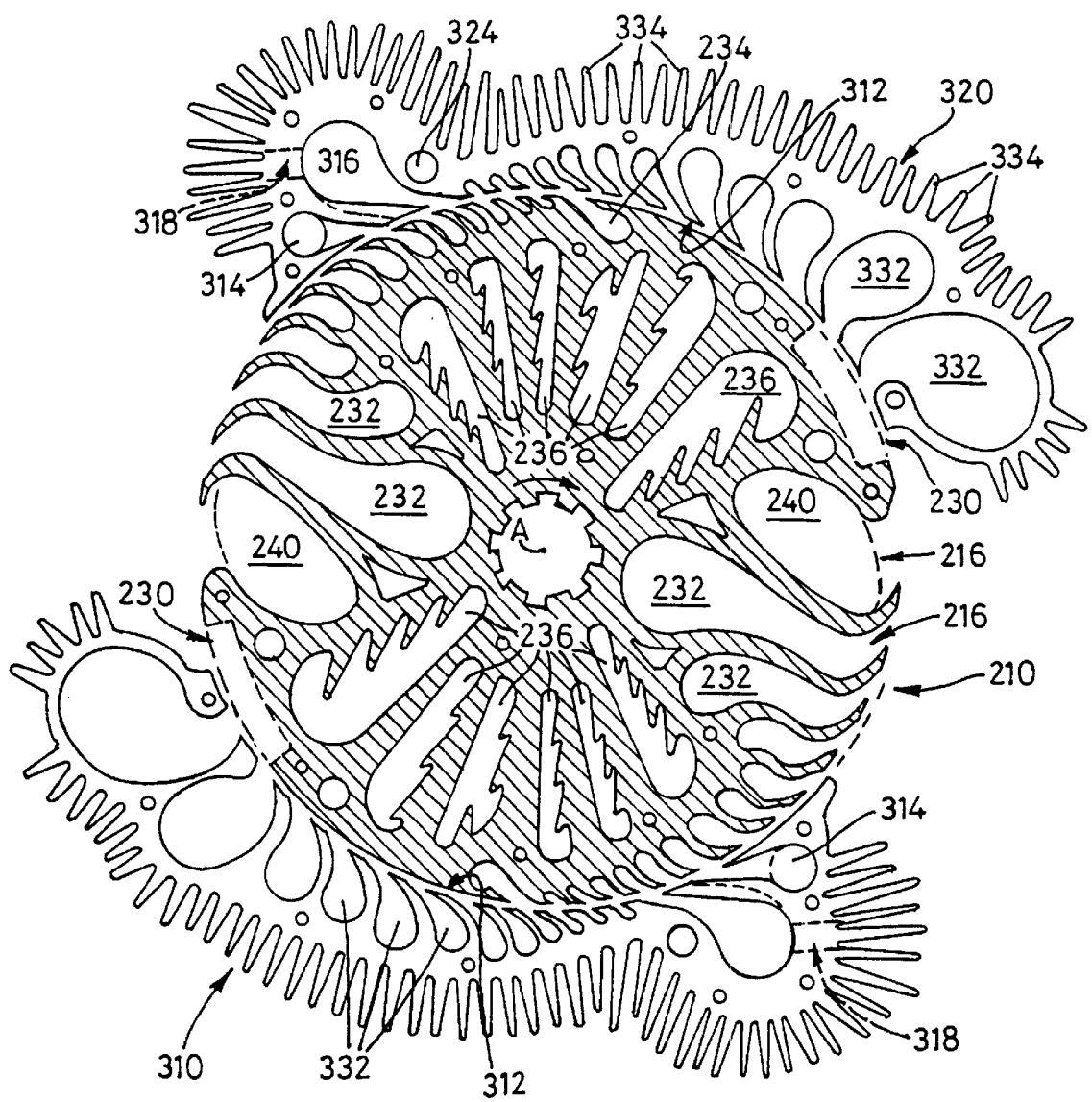
FIG. 7 is a part sectional view of a rotor and a stator of a combustion assembly of the engine of FIG. 1 showing their relationship with one another.

Within the combustion assembly 116, fuel is burned with the aim of causing a torque to be applied to the shaft 122 so that the rotating shaft can do useful work. In this embodiment, torque is generated at a rotor assembly 210 that is rotationally fixed to the shaft 122. The process by which torque is generated includes combustion of fuel in combustion chambers defined between the rotor 210 and a plurality of stator assemblies 310 in a general arrangement as shown in FIG. 7. These components will be described in detail below.

Figure 8:
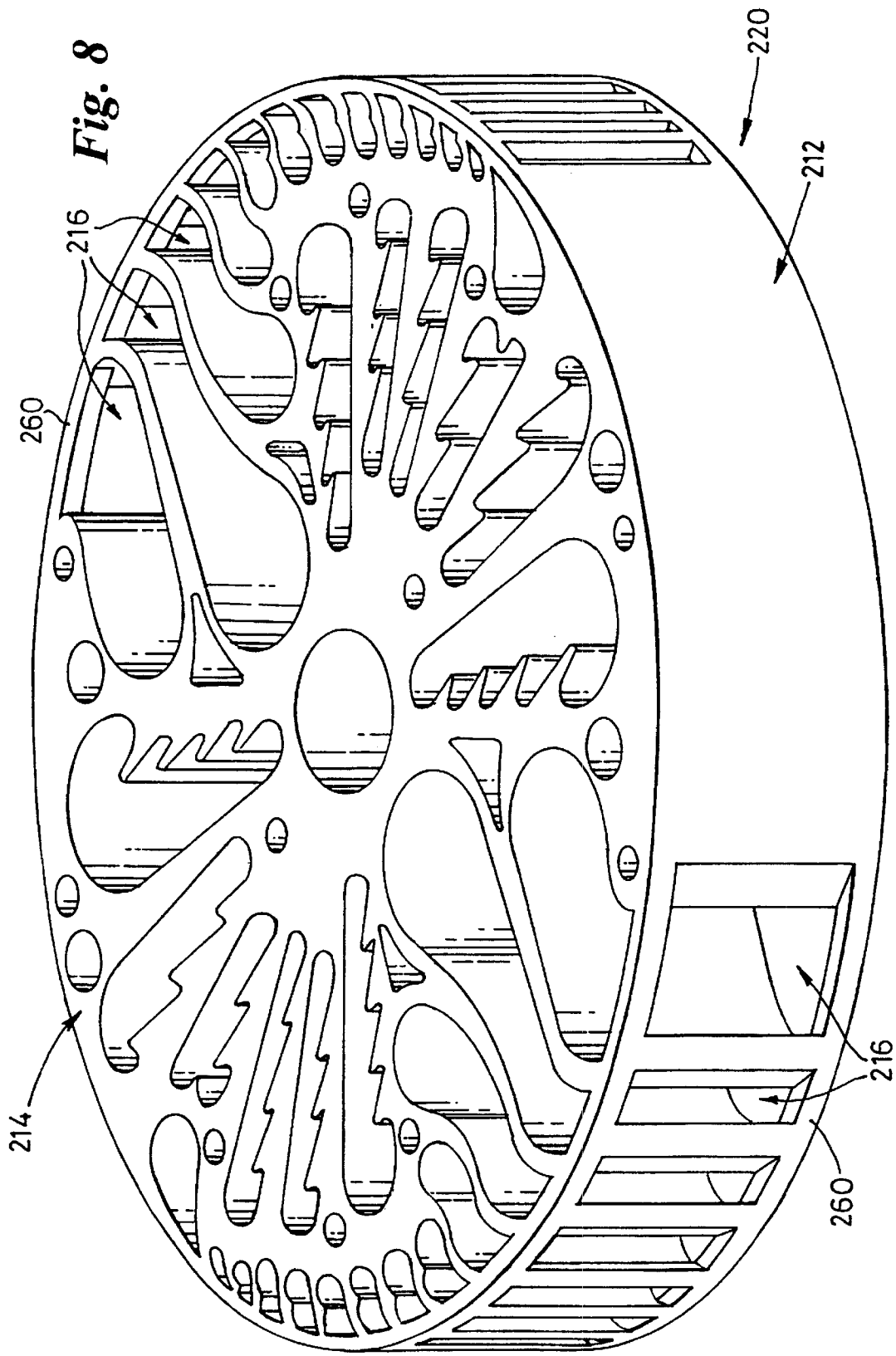
FIGS. 8 and 8a are a perspective and axial views of a rotor casting of a rotor assembly of the engine of FIG. 1.
Figure 8A:
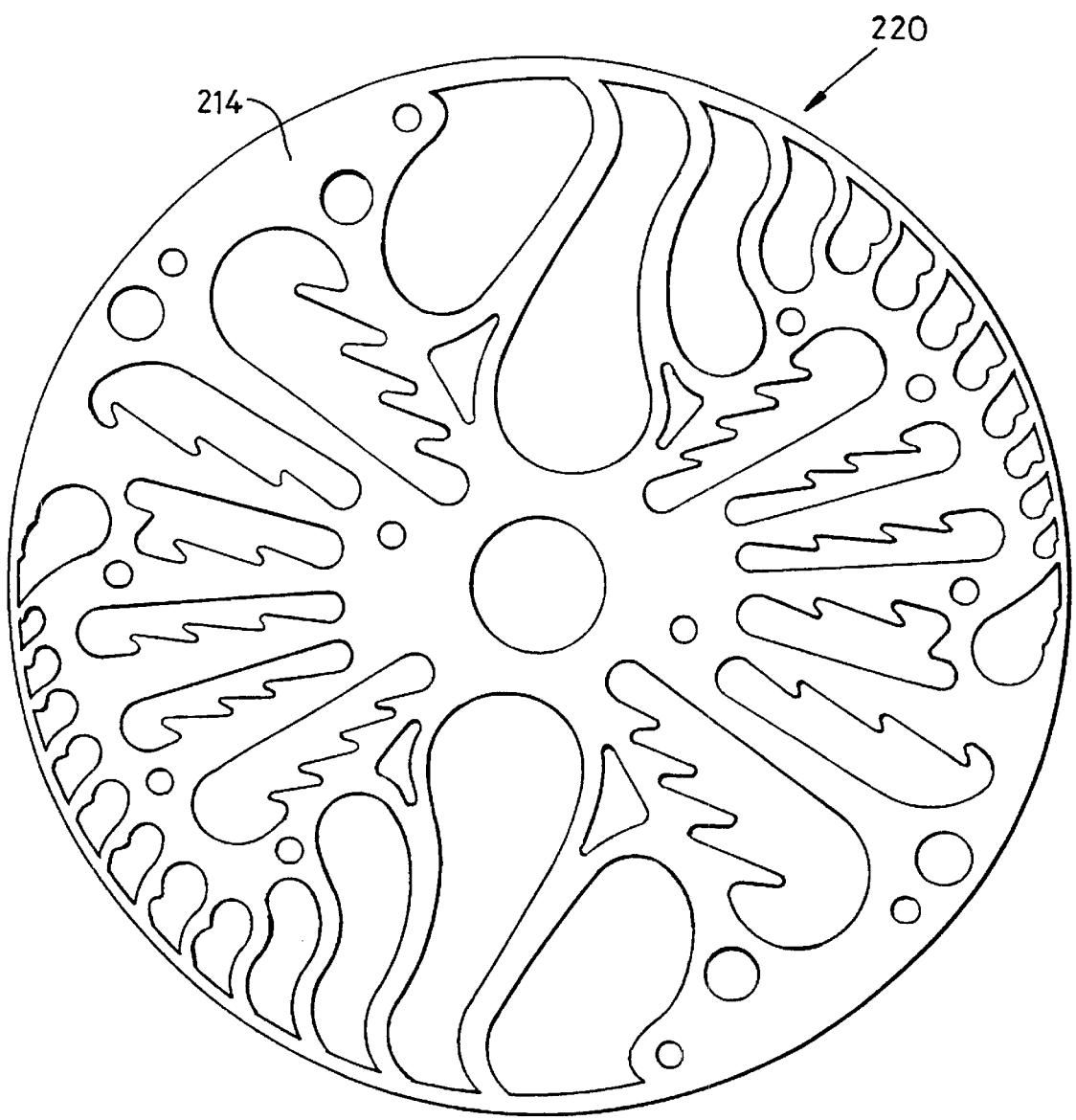
Figure 9:
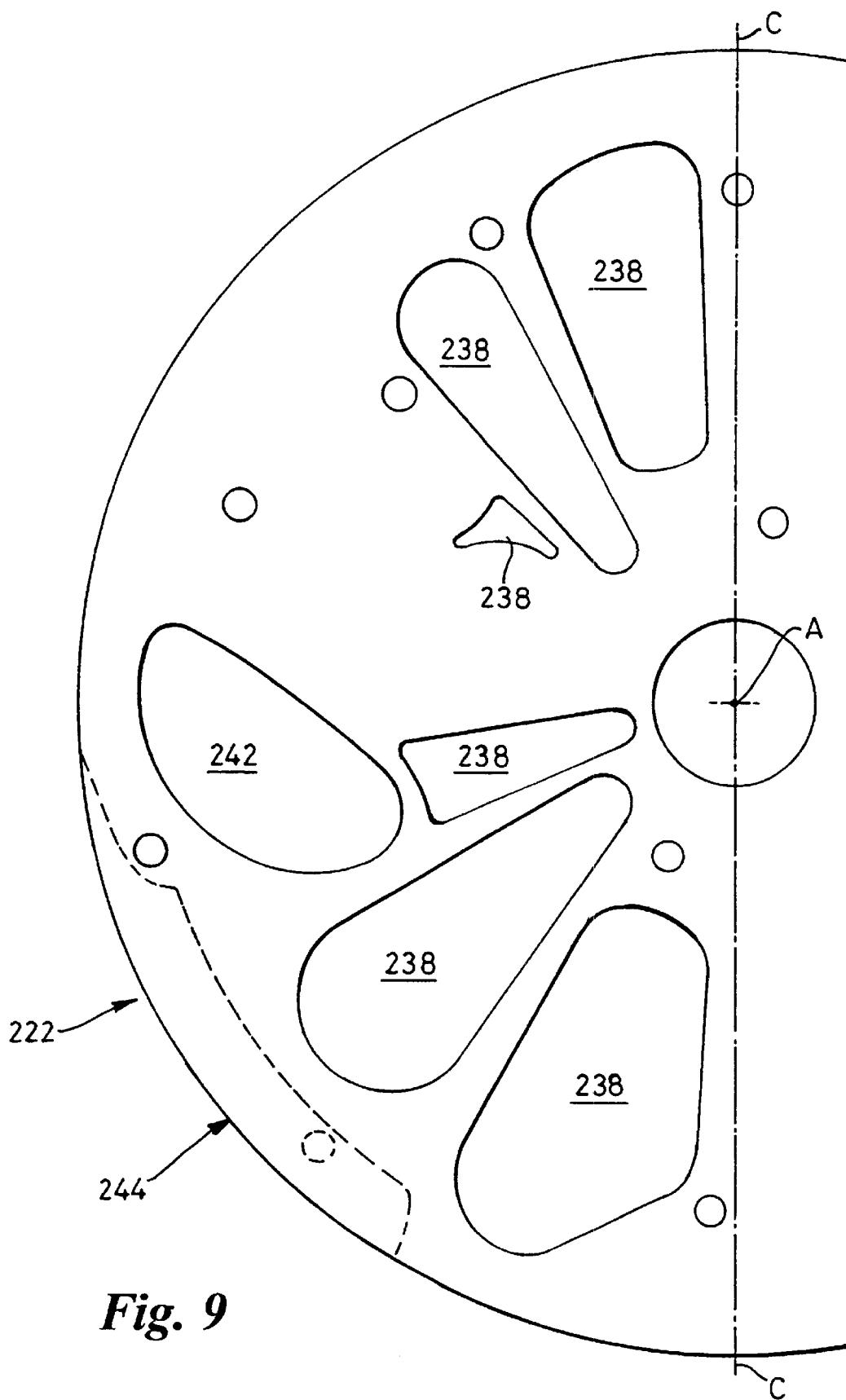
FIG. 9 shows an end plate for the rotor casting of FIG. 8.

Turning now to FIGS. 7 to 9, the rotor assembly 210 has a peripheral shape of a short cylinder, in that it has a cylindrical outer surface 212 centred about the engine axis A, and spaced, parallel faces, normal to the axis A, each circular in shape. The rotor is carried on the shaft 122, fixed, in this example by splines, for rotary motion with the shaft about the engine axis A. As shown in FIG. 7, such motion (when the engine is in operation) is clockwise. The rotor 210 assembly is rotationally symmetric about the axis A. In this embodiment, the rotor 210 has a symmetry number of two, such that it appears substantially unchanged upon rotation about the axis by 180°.

The rotor 210 assembly includes a one-piece metal rotor casting 220 (shown in FIG. 8). The rotor casing is clamped between two generally disc-shaped end plates 222, as shown in FIG. 9, to form the complete rotor assembly. (It should be noted that FIG. 9 illustrates just one half of an end plate 222, to the left of the line C—C, the end plate being rotationally symmetrical about the axis A.) In this embodiment, the rotor casting and the end plates are formed from stainless steel. The use of stainless steel can provide a material of high tensile strength that is resistant to corrosion, and in particular, to corrosive action of sulphur and its compounds. Such corrosion resistance can be important in many applications.

Within the rotor casting 220 there is formed a multiplicity of voids. Each of the voids extends axially through the rotor casting 220. Some of the voids extend within the rotor to open through a respective aperture 216 in the cylindrical outer surface of the rotor 210. Each aperture 216 extends to a parallel to the axis so as to approach but stop short of the parallel faces 214, therefore leaving a band 260 of metal that surrounds the periphery of the rotor casting adjacent to its two axial ends. Circumferentially, each aperture 216 extends by the same extent as the void within. The end plate 222 closes the axial ends of some of the voids such that their only external opening is through the cylindrical outer surface 212 of the rotor casting 220. Adjacent to axial ends of others of the voids, the end plate is cut away to leave open the axial ends of the voids. The configuration and the function of the various voids will be described in detail below.

The presence of the periphery bands helps to conduct heat away from the hottest parts of the rotor casting, and also helps to strengthen and damp rotor chamber walls against mechanical vibration. A suitable deadening substance, such as a high-melting-point wax may be provided to further reduce vibration, for example during fine machining of the rotor periphery.

The voids are of a wide variety of different shapes and sized determined by the function that they are intended to perform. In each rotationally symmetric half of the rotor, a plurality of expansion chambers 232, a primary chamber 234 all of which have an opening at the cylindrical outer surface 212 only. Additionally, there are cooling fluid ducts 236, which are open to both their axial ends, but which have no opening to the cylindrical outer surface 212. Adjacent to each of the cooling fluid duct 236, the end plate 222 has a cooling fluid aperture 238. (Note that in this embodiment, one such cooling fluid aperture 238 may surround several cooling fluid ducts 236.) There is also an exhaust chamber 240, adjacent to which the end plate 222 has an exhaust aperture 242.

There is also an inlet transfer chamber 230 is formed as a pair of circumferentially extending elongate troughs, each being formed at the intersection of the cylindrical outer surface 212 of rotor casting 220 and the axially opposite parallel faces. Adjacent to each of the troughs, the end plate 222 has an inlet recess 244 that extends substantially the length of the trough, but which extends axially only partway through the end plate 222.

Each of the primary chamber 234, each expansion chamber 232 and the exhaust chamber 240 have a shape that will be referred to as "retort shaped". That is to say, it has a relatively narrow opening at the outer surface 212 of the rotor casting 220, extending through a thin neck section into a bulbous interior. The neck sections are curved such that they extend generally in the direction of rotation of the rotor casting 220 at an acute angle from a tangent of the outer surface 212. The purpose of this shape is to limit heat loss by value of its bulbous cross section. Also to accelerate the exiting gases through the mouth, to improve the impulse effect of the gases in their dance of harmonic fluctuations, that is described later. The shape also assists to create smooth gas flow and gas rotation.

As the rotor rotates, the first chamber encountered is the transfer chamber 230. After an interval (referred to as "the timing gap") the next chamber encountered is the primary chamber 234 (also referred to as a "maid chamber". Then follows the expansion chambers 232 (in this embodiment, twelve of them). Each successive expansion chamber 232 is greater in volume than its predecessor. The primary chamber 234 has a volume larger than the first few of the expansion chambers 232. The timing gap is equivalent to advance before top dead centre in a conventional Otto cycle engine.

In a spark ignition engine the combustion chamber 316 may be larger than the primary chamber to provide enhanced gas fluctuations. The primary chamber may have a volume of between 15% and 35% (for example, 30%) of the volume of the combustion chamber. In the Diesel-like cycle this chamber is not so enlarged as it would remove gas prematurely in the fuel injected burn process.

As can be seen in FIGS. 1 and 7, the stator includes two substantially identical stator assemblies 310 carried on a cap control system mounted on engine chassis (not shown). The stator assemblies are disposed rotationally symmetrically around the engine axis A such that one stator assembly is in a position rotated 180° around the axis with respect to the other stator assembly. Details of the mounting for the stator on the chassis and of the gap control system will be described in more detail below.

Figure 10:
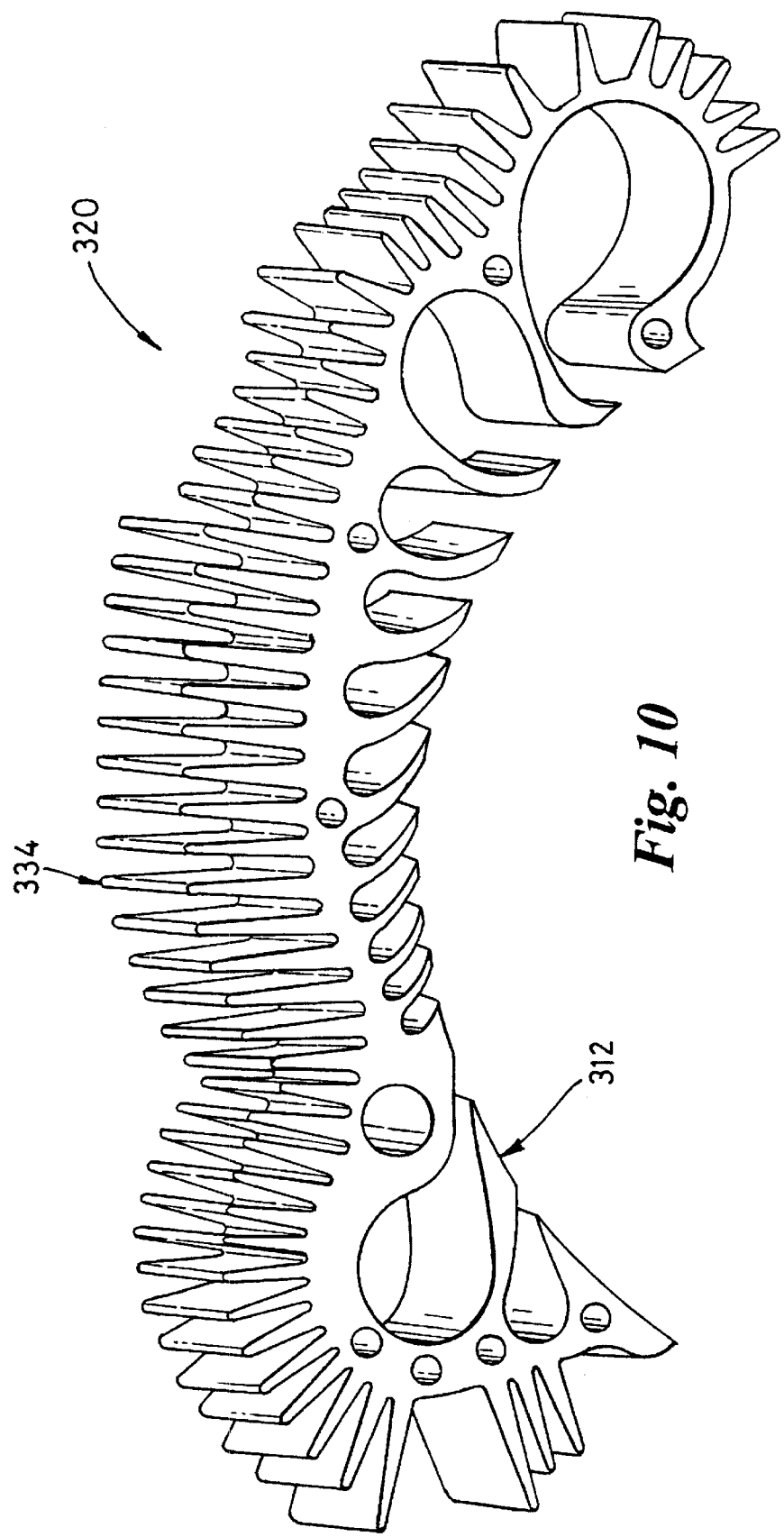
FIGS. 10 and 10a are perspective and axial views of a stator casting of the engine of FIG. 1.
Figure 10A:
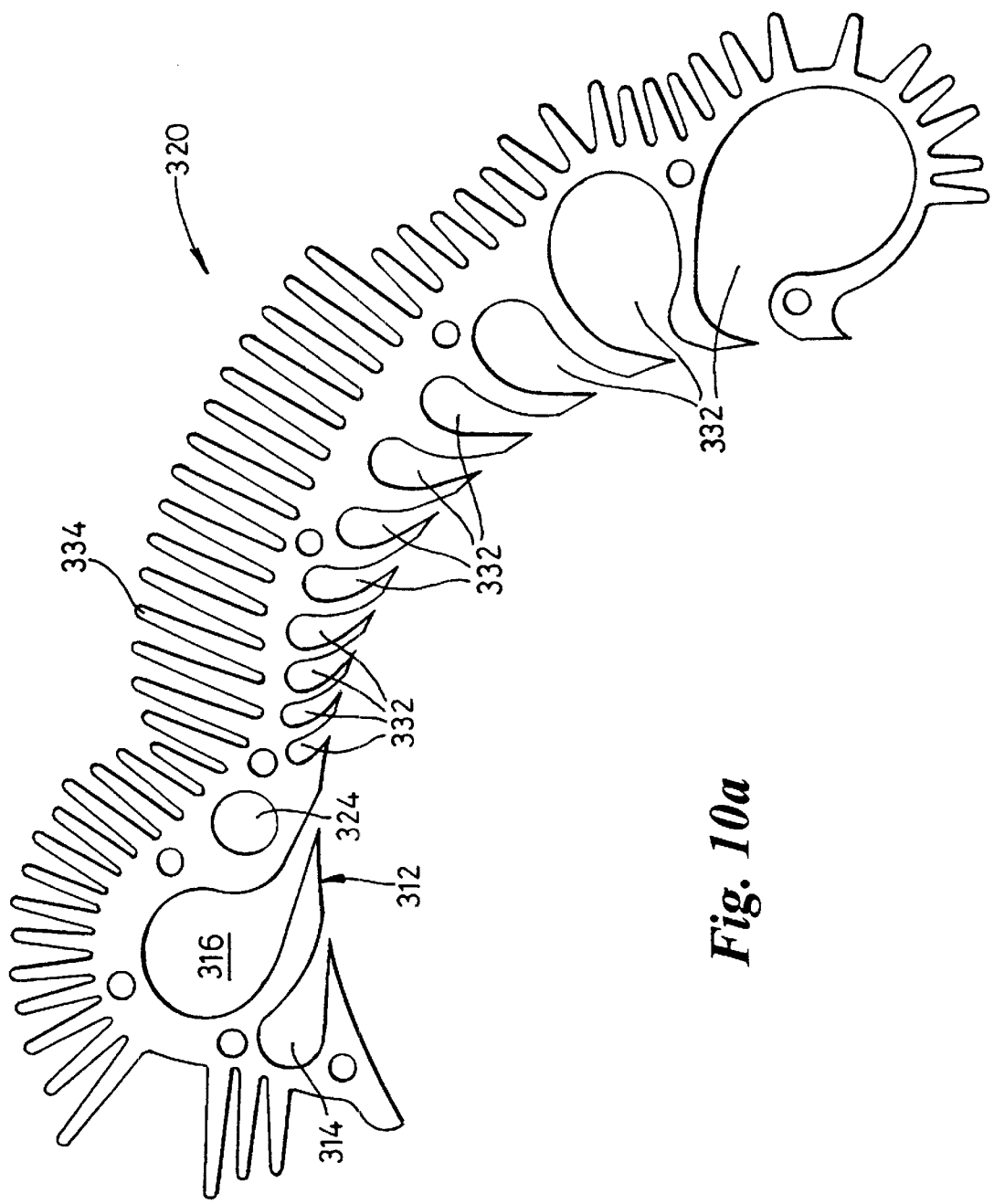
Figure 11:
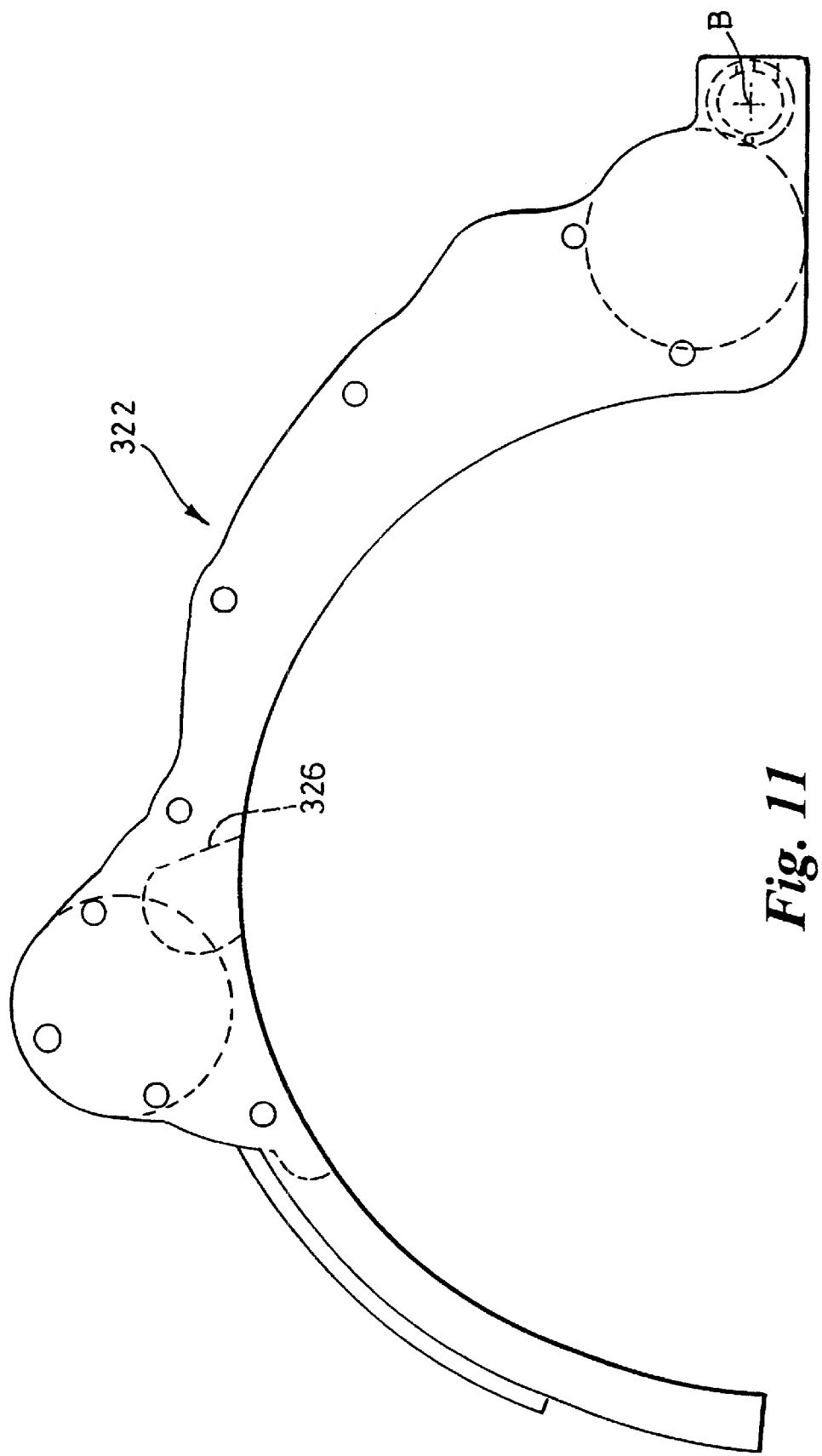
FIG. 11 is an end plate for the stator casting of FIG. 10.

Each stator assembly includes a stator casting 320, which is clamped between two end plates 322. As illustrated in cross-section in FIG. 7 and in perspective in FIG. 10, the stator casting 320 is formed as a one-piece metal casting. In this embodiment, the metal chosen is spherical graphite iron. This metal has, to some extent, the property of being self-lubricating.

The stator assembly 310, when in position in an engine embodying the invention, extends generally in a curve surrounding the engine axis A. An inner surface 312 of the stator casting 320 lies on a locus that is a segment of a circle that is centred upon the rotor axis. The stator casting 320 also has opposed parallel side surfaces disposed normally of the rotor axis against which the end plates 322 lie. A plurality of voids is formed in the stator casting 320, each void extending through the casting from one of its side surfaces to the other, the ends of the voids being sealed by the end plates 322. The voids extend to openings through the inner surface 312, and are retort shaped, as described above. In the stator, the neck sections of the voids are curved such that they extend generally in a direction opposite to the direction of rotation of the rotor 210 at an acute angle from a tangent of the inner surface. The stator casting 320 is further provided with a multiplicity of fins 334 that serve to dissipate heat from the casting.

In the direction of rotation of the rotor 210, the first chamber in the stator 310 is referred to as the coolant injection chamber 314. This retort-shaped chamber is not directly connected with the combustion process. Instead, cold air optionally loaded with an oil mist and/or water droplets, is injected into the coolant injection chamber 314, such that the air and oil impinge upon the rotor casting 320. This prepares the rotor for the imminent combustion sequence.

Subsequent (in the direction of rotation of the rotor) to the coolant injection chamber is the combustion chamber 316. In this example, the combustion chamber 316 is retort shaped. A tapped hole 318 is formed through the stator casting into the combustion chamber. A spark plug (not shown) can be inserted into the tapped hole 318 such that its electrodes extend into the combustion chamber 316.

Next to the combustion chamber 316, an inlet passage 324 is formed in the stator casting 320. The inlet passage 324 is a cylindrical void that extends axially through the stator casting 320. Ends of the inlet passage communicate with transfer recesses 326 in each of the end plates 322. Combustion mixture can enter the transfer recesses 326 through passages in either one or both end plates 322. In the former arrangement, the inlet passage conducts the combustion fixture from the said one end plate 322 to the transfer recess 326 in the other end plate.

After the combustion chamber 316 there is a multiplicity (twelve in this embodiment) of retort-shaped expansion chambers 332. The volume of the expansion chambers 332 increases sequentially in the direction of rotation of the rotor 210.

Operation of the Combustion Assembly

With reference now to FIGS. 12a to 12e and FIG. 13, there is shown a combustion sequence in the engine of FIG. 1. (It must be remembered that this sequence of events is taking place simultaneously in both of the stator assemblies on diametrically opposite sides of the rotor.)

First, it should be borne in mind that the inlet passage 324 is filled with combustion air and fuel mixture under high pressure. This chamber is substantially sealed because the transfer recesses 326 of the end plates 322 abut against the end plates 222 of the rotor assembly 210.

Figure 12A:
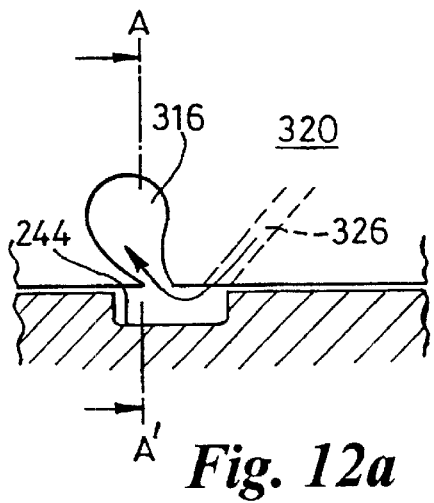
FIGS. 12a to 12e are schematic cross-sectional views of part of the rotor and the stator of FIG. 2 during a combustion cycle, with FIG. 12a being a section along the line A–A' of FIG. 7.
Figure 13:
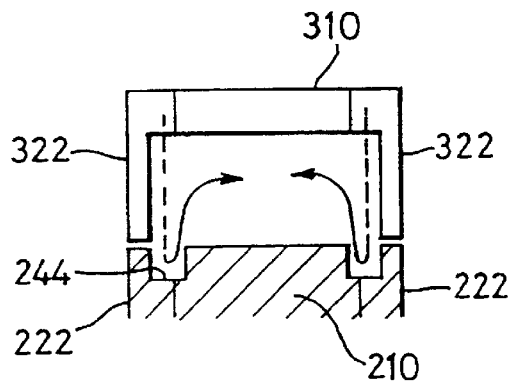

Now, the rotor assembly 210 rotates until the inlet recesses 244 come into position radially inwardly of the transfer recesses 326 (FIG. 12a). Combustion mixture can then pass through the inlet recess 244 into the combustion chamber 316, as shown in FIG. 13.

Figure 12B:
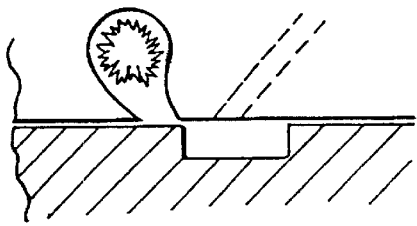
Figure 12C:
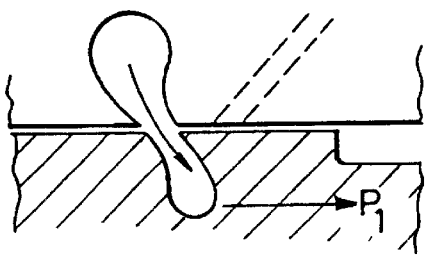
Figure 12D:
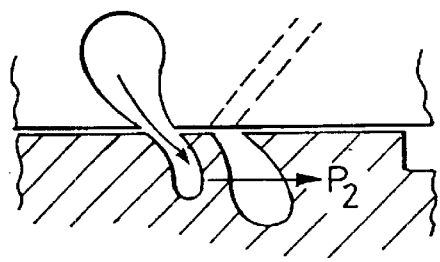
Figure 12E:
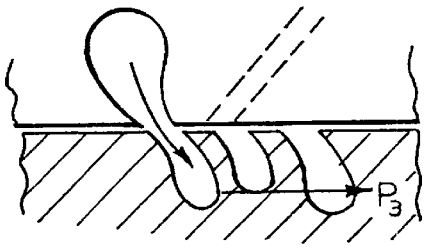

Following continued rotation of the rotor assembly 210, the passage between the inlet passage 324 and the combustion chamber 316, so sealing the combustion mixture within the combustion chamber 316. The spark plug can then be energised to initiate combustion within the combustion chamber 316 (FIG. 12b).

Next, the primary chamber 234 comes into alignment with the combustion chamber 316 causing gas to expand rapidly from the combustion chamber 316 into the primary chamber 234. As the gas impinges upon the walls of the primary chamber 234, it is decelerated, with the result that some of its momentum is transferred to the rotor. During this transfer, a force is applied to the rotor that results in a force couple around the engine axis A, and therefore, a torque is transferred to the shaft 122. Expansion of gas from the combustion chamber is repeated as subsequent expansion chambers 232 pass the combustion chamber 316, the pressure in the combustion chamber being successively reduced.

Simultaneously, the primary chamber 234 passes the first stator expansion chamber 332, and an amount of gas expands from the primary chamber 234 into it. This causes a further small impulse to be applied to the rotor. This process is repeated for subsequent expansion chambers with successive reductions in the pressure in the primary chamber 234.

Gasses are taken to exhaust in two ways. Gasses in the rotor can escape freely once the chambers move beyond the stator, and gas can escape from the stator chambers into the rotor exhaust chamber 240.

In an alternative mode of operation, a comparatively large quantity of water is injected into the coolant injection chamber 314. This water is converted to steam in the rotor chambers 232,234, so transforming the rotor assembly 210 into a steam raiser. This steam expands from the rotor chambers 232,234 into the stator chambers 332 together with the combustion gasses without dowsing combustion, and so contributes to applying a force couple to the rotor 210. In this mode, the engine effectively operates as an internal steam turbine, this being a distinct class of engine.

It will be noted that if there are (for example) ten chambers in the rotor, other than the transfer chamber, ten impulses will be imparted to the rotor by the gas transference mechanism. If the number of stator chambers is the same as the rotor, although the number of chambers is doubled, the number of separate impetuses has squared. A total often rotor and ten stator chamber will provide one hundred separate impetuses to the rotor, with the gas fluctuating backwards and forwards between the various chambers. These can be considered to be harmonic gas fluctuations of a cadence recursive process. This combined with the direct force couple acting on the rotor assembly, rather than through a system of mechanical linkages, together with the rotational speed, is what helps to give the engine its power and efficiency.

A key to the engine's performance is that there are not only chambers in the rotor, but also similar chambers in the stator. Each expansion chamber adds an additional impetus to the rotor, so that in the example shown there will be 169 (that is, 132) separate impetuses given to the rotor. The expansion process can be termed harmonic gas fluctuations in a cadence recursive process. This combined with the direct force couple acting on the rotor assembly, rather than through a system of mechanical linkages, together with the rotational speed, is what helps to give the engine its power and efficiency.

Fuel Injection/Carburetion

Fuel injection or carburetion can be made at any of several places. Examples include: at the input 100 to the compressor 110; within the compressor 110; at the output of the compressor in the transfer piping or chamber 114; directly into the combustion chamber 316; or, as described above, via a transfer chamber. Injection or carburetion may, indeed, be made at one or more of these points. Numerous configurations of compressor(s) and combustion assemblies are possible, but the injection or carburetion possibilities across these configurations follow the basic options described.

Exhaust

Exhaust gasses from the combustion assembly 116 are extracted through a tapering annular Venturi 144. At an outlet of the Venturi 144, the exhaust gas combines with the cooling air stream, and the combined gas streams are drawn into the exhaust gas turbine 118. Under conditions of high power operating, the exhaust gas stream may be of sufficient volume and speed to drive the turbine 118 and make a net contribution to the output power of the engine. The turbine 118 also serves to scavenge exhaust gasses from the combustion 116 assembly, and assists in maintaining the cooling air stream.

At the exit of the Venturi, there is provided at 152 a plurality of passages that taper in the direction of exhaust gas flow, each of which tapers in a V-shaped cross-section in the direction of exhaust gas flow. This subjects flow of exhaust in the desired direction to an impedance less than in the reverse direction. This arrangement reduces the risk of the exhaust backflushing into the combustion assembly under pressure from the cooling air.

Figure 14A:
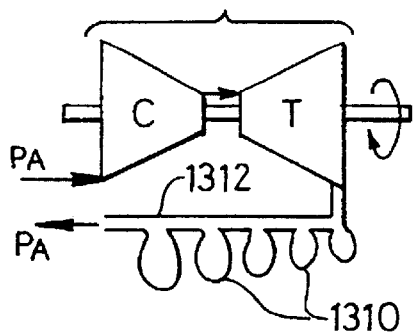
FIG. 14a is a first exhaust configuration suitable for use with the engine of FIG. 1.

The exhaust frequencies from the engine are typically higher than is the case with conventional engines. For a horizontally opposed two 'cylinder' equivalent engine of maximum speed N revolutions per second and n chambers in each of the rotor and stator, the base frequency is 2N Hz, with the main harmonic component 2nN Hz. The sound pressure wave may be reduced by placing a series of Helmholz resonators in the exhaust pipe, as shown in FIG. 14*a*. At their simplest, the Helmholz resonators may be side chambers 1310 (for example, approximately spherical in shape) into which exhaust gas can expand from an exhaust pipe 1312.

Figure 14B:
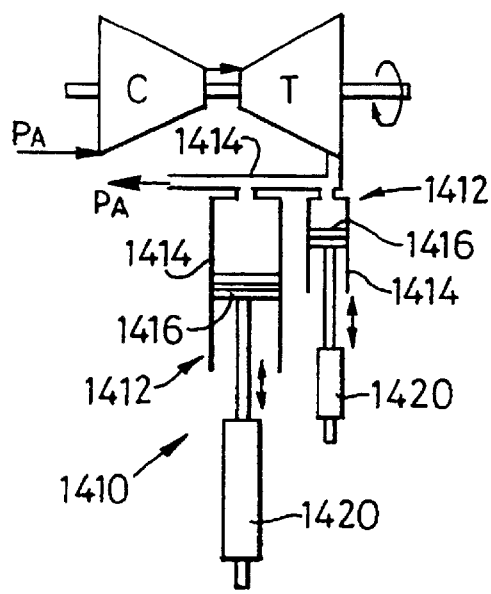
FIG. 14b is an alternative exhaust configuration suitable for use with the engine of FIG. 1.

In an alternative embodiment, one, two or more tuneable resonators of unequal size may be used, as shown schematically in FIG. 14*b*. Each resonator 1410 includes a cylinder 1412 into which exhaust gas can expand from an exhaust pipe 1414. The cylinders are each closed by a respective piston that can be moved to change the volume (and hence the audio resonant frequency) of the resonator 1410. The tuneable resonators 1410 are designed such that the larger one absorbs the base frequency, the smaller one the principle harmonic. The tuning piston 1416 of each resonator is moved while the engine is in use, the position of each of the resonators being coupled to the engine speed by means of a servo mechanism 1420. The volume of both resonators 1410 is decreased as the engine speed increases.

Detection of Misfiring in a Spark-ignition Engine

Figure 15:
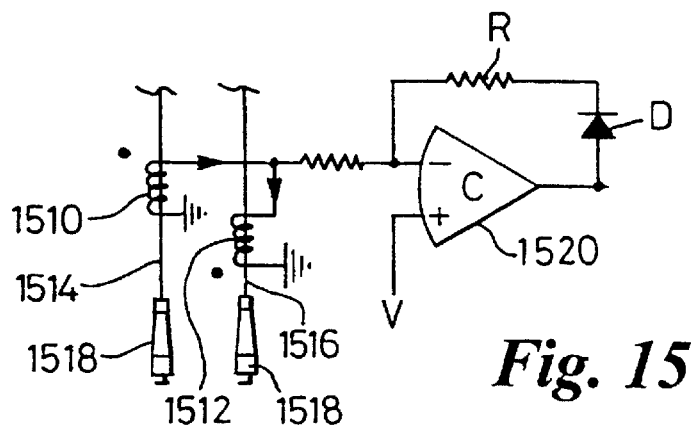
FIG. 15 is a circuit diagram for an engine misfiring detection system suitable for use with the engine of FIG. 1.

As shown in FIG. 15 (in one embodiment) small sensing coils 1510 and 1512 are wrapped around the ignition leads 1514, 1516 that feed the spark plugs 1518 in an engine, for example, as described above. The coils 1510,1512 feed opposite sense inputs to an amplifier 1520 of gain defined by resistance R. A reference voltage V feeds the other input and sets a trigger threshold. When the plugs 1518 operate normally both coils 1510,1512 pick up the same induced current and the output of the amplifier 1520 is nearly at zero volts. When a plug 1518 misfires, the output of the amplifier 1520 pulses either positive or negative. Such pulses may be used to trigger an alarm. If a diode D is incorporated in the feedback path, the amplifier 1520 will self-latch to provide a continuing indication that misfiring has occurred.

Lubrication

Figure 16:
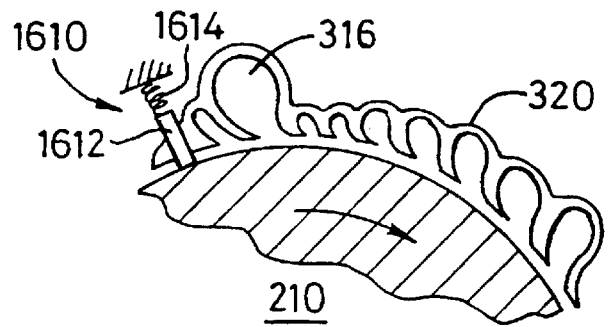
FIG. 16 shows a lubricant brush suitable for use with the engine of FIG. 1.

Lubrication of the rotor-stator surfaces may be achieved (as discussed above) by injection of oil, fine air-oil mist spray, or solid graphite. Alternatively or additionally a lubricant 'brush' 1610 may be provided, as shown in FIG. 16. The lubricant brush 1610 includes a body of lubricant material, such as a graphite bar 1612. A spring 1614 holds the brush against the surface of the rotor 210. The brush is carried on the stator just prior to the combustion chamber 316; the position at which maximum efficacy may be obtained.

Rotor/Stator Gap Control

An engine embodying the invention typically operates at speeds far in excess of conventional piston engines, perhaps up to 30000 rpm. One problem that this presents is that the diameter of the rotor increases as a result of thermal expansion and centripetal elastic deformation as speed of the rotor increases. However, simply increasing the rotor/stator gap is not a satisfactory solution because this would allow excessive gas leakage from the various chambers.

Systems may be incorporated into embodiments of the invention to control precisely the gap separation between rotor and stator. This process will be termed dynamic gap control. The objective of either arrangement is to bypass the need for vulnerable sealing tips and rings, although these may be employed if desired. Such seals (if provided) are typically located at the rotor or stator chamber cheeks and around the rotor shoulders. In an axial configuration (see below), there is no need for dimension changing, only gap control. However the stator and rotor chambers are much more difficult to manufacture and thrust bearings, or some form of thrust balancing is necessary. In either design approach, the combination of the rotor's high speed and the fine gap control means that ideally no seals are needed, as firstly the gas 'escape time' is reduced due to the rotational speed and secondly the gap is sufficiently narrow to reduce leakage.

A principle objective is to keep the rotor/stator gap constant at all engine speeds. This can be achieved by a control system that: a) measures the gap dimension either directly by contact means or by other sensor technique such as proximity detection or laser beam; b) infers the gap measurement from component temperatures (rotor and stator) together with rotor speed; or c) is a combination of both types a) and b).

In this embodiment, the gap is controlled by moving the stator assemblies towards or away from the engine axis A, this movement being controlled by a control system. To achieve this, each stator assembly is carried at its leading and trailing edges on a respective camshaft. Rotation of the camshafts cause consequential movement of the stator assembly towards and away from the engine axis A. The camshafts are arranged for contrarotation so that the forces they apply to the stator assembly 310 are, as near as possible, balanced.

Figure 17:
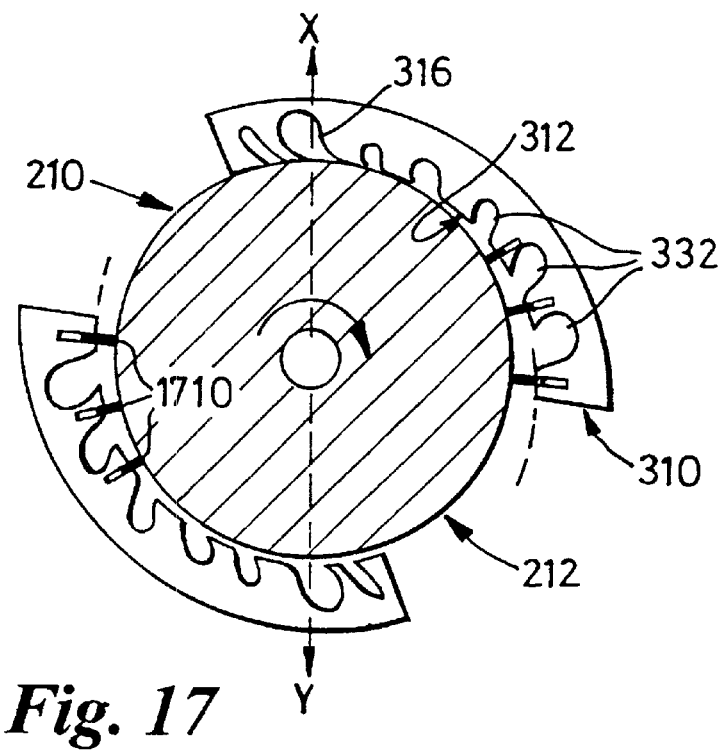
FIGS. 17 and 18 show, diagrammatically, relative movement of the stator and the rotor of the engine of FIG. 1.
Figure 18:
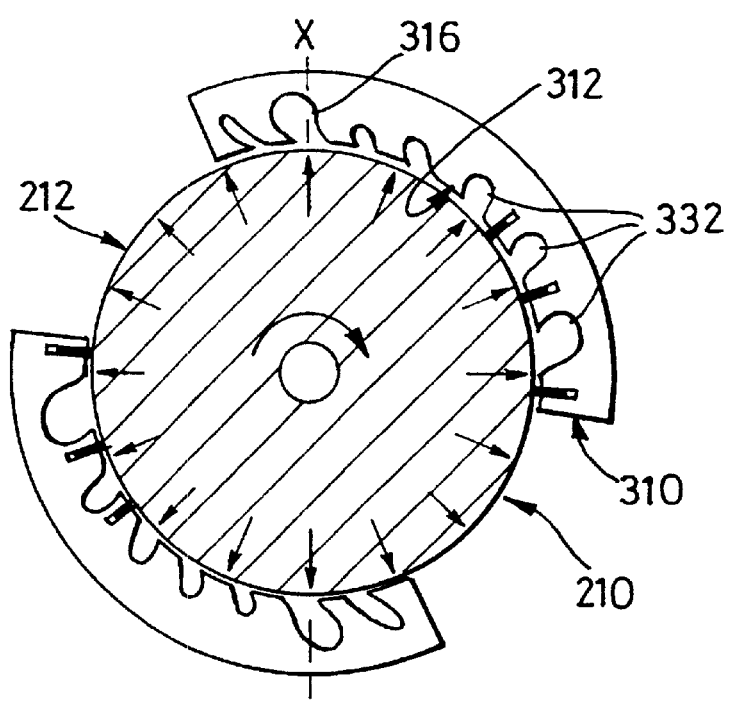

In this embodiment (designated generally as an "expanding jaw" configuration), the radius on the stator inner facing surface 312 is greater than the radius of the outer surface 212 of the rotor 210 when it is cold and stationary. This is shown in FIG. 17. These radii are designed to be the same when the engine is running at near maximum speed and temperature, as shown in FIG. 18. As the speed of the rotor 310 increases and its temperature rises, the stator position is adjusted outwards by means of a controlled servomotor and mechanical driving system (not shown) to maintain a constant gap distance at the opening of the combustion 316. Some compromise of the gap distances occurs at the last stator expansion chambers 332, in that their gaps will be too wide until near full speed and temperature is reached. (In alternative embodiments, this effect can be reduced by providing more jaws, and/or by segmenting the stator into further segments.) Alternatively or additionally sealing strips 1710 may be added to the stator cheeks of these last chambers 332. The advantage of this dynamic jaw system described is that the chamber design and manufacture are not complicated and the rotor can be used for gas transfer without enlarging the transport areas. Thus the engine design is kept compact and simple, at the expense of optimum gap dimensions occurring nearer to top engine speed. It should be noted that the jaw driving mechanism is positioned 'offset' to ensure that the jaw movement aligns with the two combustion chambers, (line X-Y in FIGS. 17 and 18).

Details of the 'Tapered' Embodiments

Figure 19:
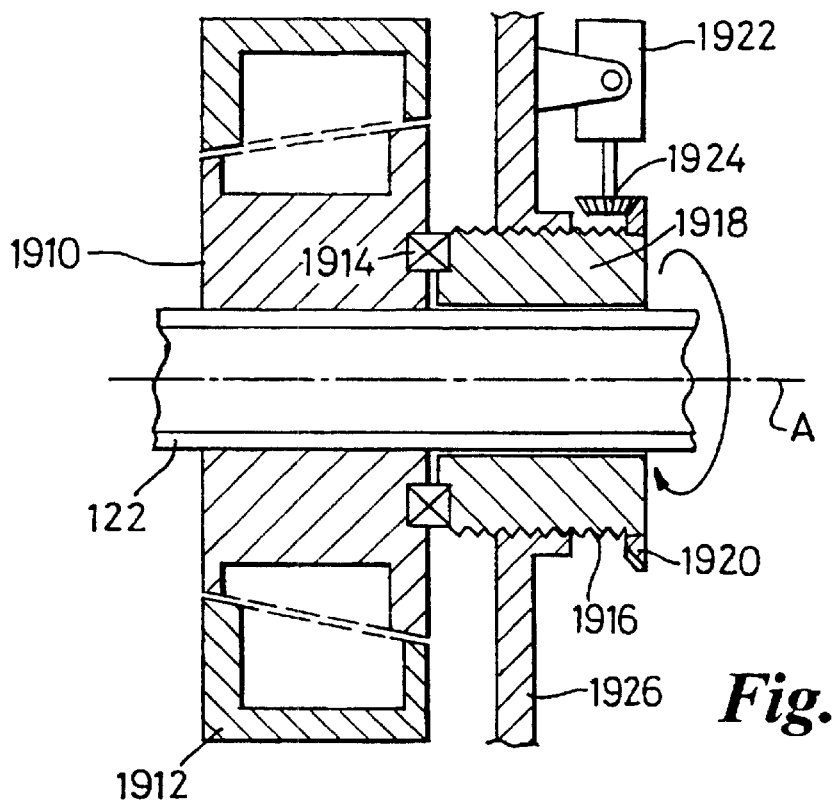
FIGS. 19 and 20 are cross-sectional views of an alternative embodiment of the invention.
Figure 20:
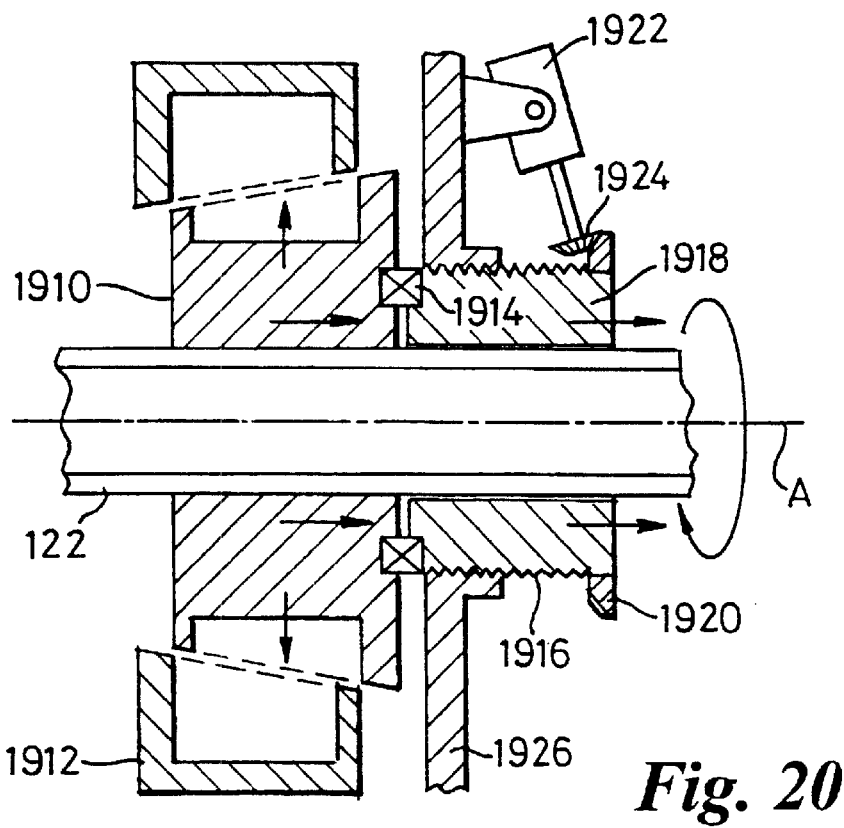

In alternative embodiments, the rotor/stator gap is controlled by forming the rotor in the shape of a frustum, as shown in FIGS. 19 and 20.

In the tapered embodiments, the rotor and stator are both tapered to the same amount. When the rotor expands due to centripetal forces and both the rotor and stator expand due to thermal expansion, the rotors position is adjusted relative to that of the stator. FIGS. 19 shows the configuration of this embodiment before expansion and FIG. 20 shows the configuration of this embodiment after expansion. As will be seen, movement of the rotor 1910 axially along the shaft 122 alters the spacing between the rotor 1910 and stator 1912. Movement of the rotor 1910 is achieved by its being mounted on a splined portion of the shaft 122. An axial end of the rotor assembly 1910 is in contact with a thrust bearing 1914, which is mounted on a collar 1918 that is itself disposed concentrically with the shaft 122. An outer surface 1916 of the collar 1918 is formed with an external screw thread that is in threaded engagement with an internally threaded aperture formed in a support member 1926 that is fixed relative to the stator 1912. The collar 1918 is constrained for axial movement with the rotor 1910 but can rotate relative to it. The collar 1918 additionally has a radially projecting gear portion 1920 A servomotor 1922 acts through a gear train 1924, to effect the rotational movement of the collar, which, through the action of its threaded outer surface 1916, causes axial movement of the collar 1918. This, in turn, alters the gap between the rotor and the stator. As compared with the embodiment of FIG. 1, larger dimension transfer chambers and port areas may be necessary, unless separate port valves are employed. However optimum gap control can be provided occurs across the speed range.

Details of the "Axial" Embodiments

Figure 21:
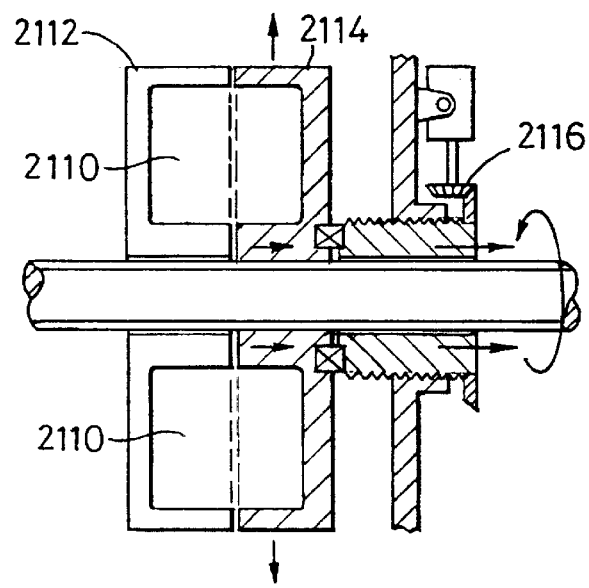
FIG. 21 is a cross-sectional view of another alternative embodiment of the invention.

With reference to FIG. 21, in another alternative embodiment, combustion and expansion chambers 2110 are defined in facing surfaces of an annular rotor 2112 and stator 2114. Axial movement of the rotor on the shaft 122 can be achieved by means of an assembly 2116 similar to that described in the last-preceding paragraph.

The expanding jaw design however is more of a compromise than the tapered design, but benefits from simpler transfer chamber and primary chamber charging design, in that the rotor can be used for this purpose. This jaw design is described in more detail later on in this patent.

Gap Control Systems

Figure 22:
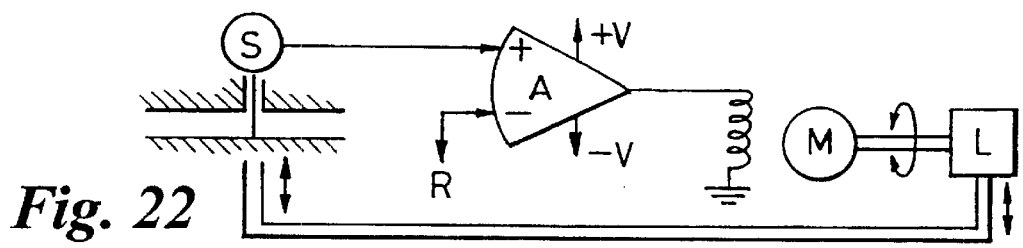
FIG. 22 to 24 show alternative arrangements for maintaining a controlled rotor/stator gap.

A first gap control system is shown in FIG. 22. In this system, a sensor S detects the gap dimension, and generates an output signal indicative of that gap. This feeds an amplifier A, which has a set point voltage reference R, for the required gap dimension. The amplifier produces an output when there is a difference between the set point and the actual gap that drives a servomotor M, which, in turn, drives a mechanical linkage L until the gap dimension is restored to the required level. This is a closed loop system. If two detectors are employed across the rotor diameter, the output voltages can be fed to a suitable electronic circuit, such as a microprocessor, to detect eccentricity and wobble.

Figure 23:
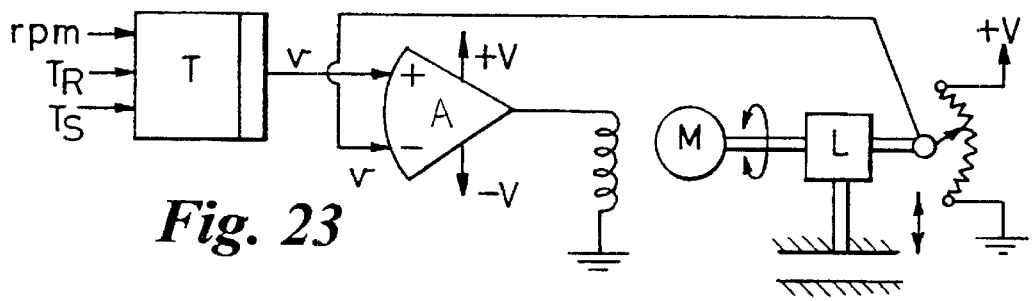

In the system illustrated in FIG. 23 there is no direct measurement of the gap dimension. Instead, a value is obtained from an electronic lookup table T dependent upon the rotor speed, rotor and stator temperatures. The servomotor M is driven to provide the correct gap setting through the linkage L. This is an open loop system.

Figure 24:
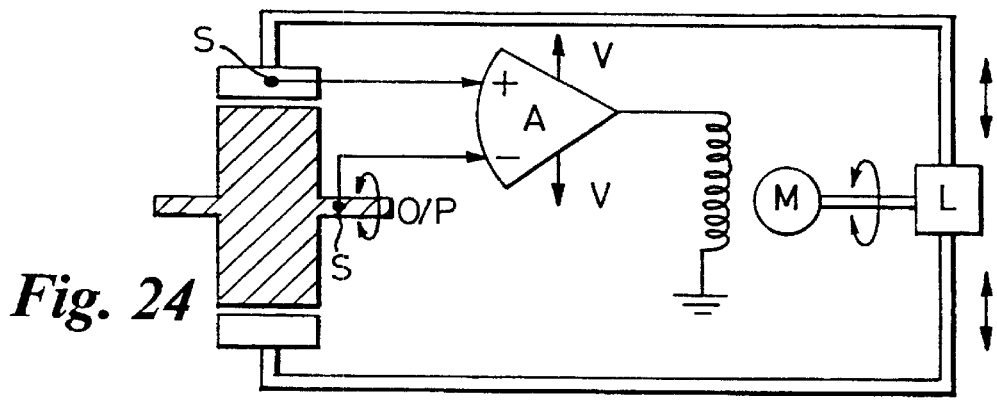

In the system shown in FIG. 24 the loop is closed by virtue of the sensor being a strain gauge, which measures the torque on the stator. The rotor-stator design allows non-critical surfaces to interact, such as at the shoulders of the rotor and stator. This creates drag. This enables the additional couple due to a finite amount of rotor slow down to be detected. This is found from extracting the torque output from a strain gauge placed in the rotor's output shaft. When no drag slow down occurs between the rotor and stator, the output of the two load cells will be equal. When the gap narrows the drag increases and the output of the stator's load cell will increase. This is operated on in a system as described with reference to FIG. 22 by the amplifier and its associated system elements to return the drag to the set point level. Hence the gap is controlled.

Bearing Monitoring

Figure 25:
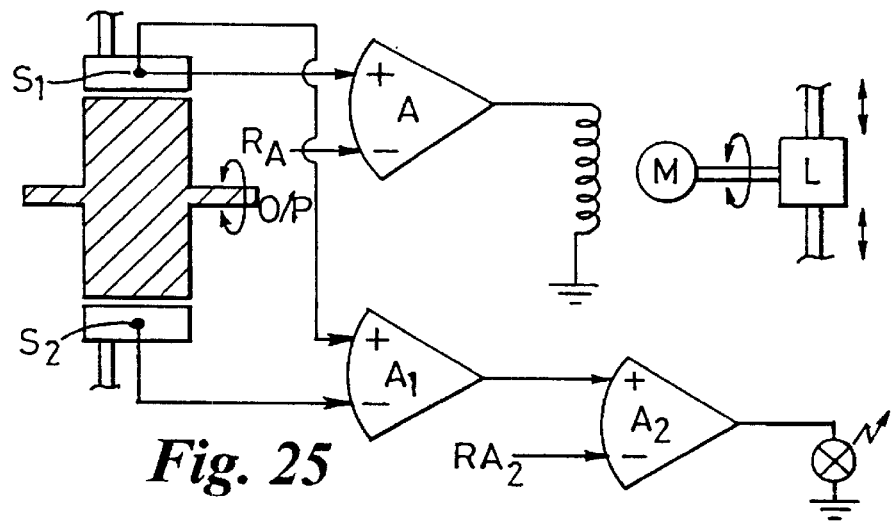
FIG. 25 show an arrangements for maintaining a controlled rotor/stator gap and monitoring bearing status.

If multiple sensors S1, S2 are employed across a rotor diameter, as in FIG. 25, bearing wobble and eccentricity can be detected. This is performed by an extra amplifier A1, which detects the difference between the outputs of the two sensors S1, S2. The output from the amplifier A1, is fed to a further amplifier A2, with a set point reference that provides an output if deviations are above the set point level. This is used to indicate wear in the bearing beyond acceptable limits.

Combined Bearing and Misfiring Monitoring With Injection and Ignition Timing

Figure 26:
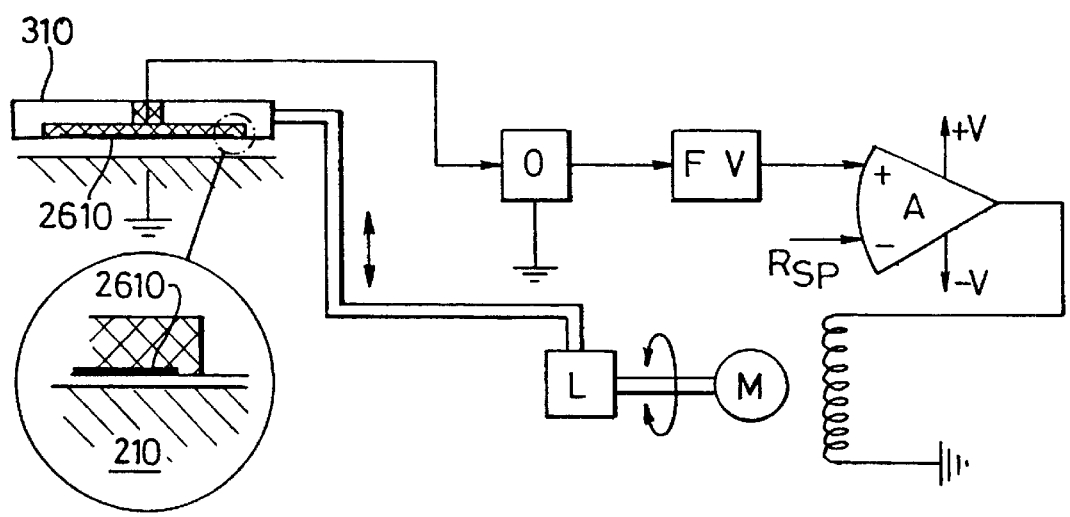
FIG. 26 shows a non-contact gap control system incorporating a capacitor plate as a sensor.

With reference to FIG. 26, there is shown, a non-contact gap control system, suitable for use, for example, with the embodiment of FIG. 1. A particular type of sensor is employed which comprises an insulated plate 2610 carried on the stator 310 and connected to a high-frequency oscillator O. The gap is measured by determining the capacitance change between the plate and the rotor. Such a change in capacitance can cause the frequency of the oscillator O to change. This is the basis of proximity detectors suitable for use in embodiments of the invention. The output of the oscillator O is fed to suitable frequency to voltage (F-V) converter F-V, such as a diode pump, whose output voltage feeds a subsequent amplifier stage A, as already described. In operation, when the gap closes, the capacitance increases between the plate and the ground plane, the oscillator frequency drops and the output from the F-V converter decreases, which is acted on by following stages.

This particular type of sensor is useful if it is positioned such that a designed disturbance on the rotor surface is scanned by it. Such a disturbance might be a transfer chamber, but could also be a specifically constructed depression or the chamber openings in the rotor. The consequence of using this type of sensor is that additional circuitry can also detect rotational position of the rotor. This means that it can be used to provide dynamic gap control as already described; timing for ignition and injection of fuel with bearing and misfiring monitoring, all combined in one sensor.

Figure 27:
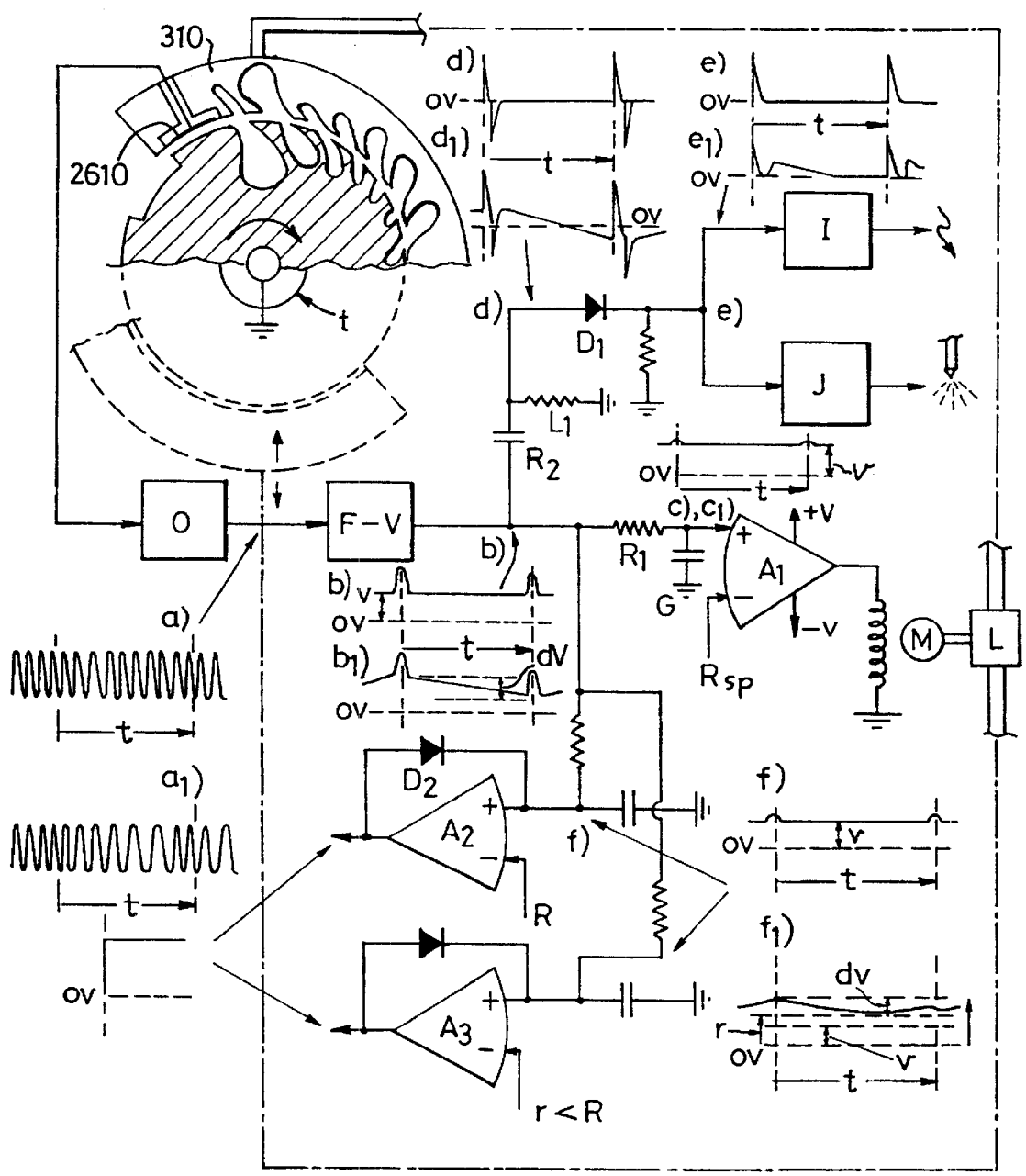
FIG. 27 is a diagram of additional circuitry for use in a combined gap control, bearing and misfiring monitoring system with injection and ignition timing.

The additional circuitry required in order to achieve this is shown in FIG. 27. The F-V converter operates upon due to the frequency modulated wave output from the oscillator O to provide a voltage output at circuit point a, which includes a sequence of spikes at circuit point b. These spikes correspond to the periodic depressions in the rotor. These spikes are integrated by a resistor/capacitor network $R_1$, $C_1$ before being applied to the gap control amplifier A1 at circuit point c. The separation between the spikes is the periodic time t of the rotor rotation. The spikes are further differentiated by a resistor/inductor network $R_2$, $L_1$ at circuit point d, and rectified by a diode $D_1$ at circuit point e. The output at circuit point e is then used to trigger ignition and injection control circuits, where used, shown as I and J respectively. The approximate voltage waveforms at each of points b, d and e are shown as the upper tracing of each of three insert sections in FIG. 27.

If rotor wobble, for example due to bearing wear, occurs, the frequency modulation at the oscillator has a further component, which results in an additional voltage ramp term being introduced at point b. The effect on the voltages appearing respective circuit points are at each of points b, d and e are shown as the lower tracing of each of three insert sections in FIG. 27.

The effect on the gap control system is that the gap is widened marginally to cater for the wobble. The ramp voltage dV illustrated in tracing point b1 is extracted by an additional stage of integration of smaller time constant than that used to feed the amplifier A1. This has a saw tooth output at circuit point f (shown as tracing f1) with much reduced spikes. The condition of no wobble produces a low output from this circuit. The ramp voltage dV can be detected by a reference amplifier A2 with a latch feedback diode $D_2$). This will latch high when the level of dV is greater than the reference voltage R). This amplifier's output hence provides indication of excess bearing wear. A further latch amplifier A3 with a lower reference point may optionally be provided to detect misfiring vibration in a similar manner.

The gap sensor discussed above can be improved upon by including an inductor in an inductor pit to linearise the response and increase the sensitivity of the sensor. (Using either an inductor or a capacitor alone produces an inverse-square-root law response.)

Compressor Configuration

Figure 28:
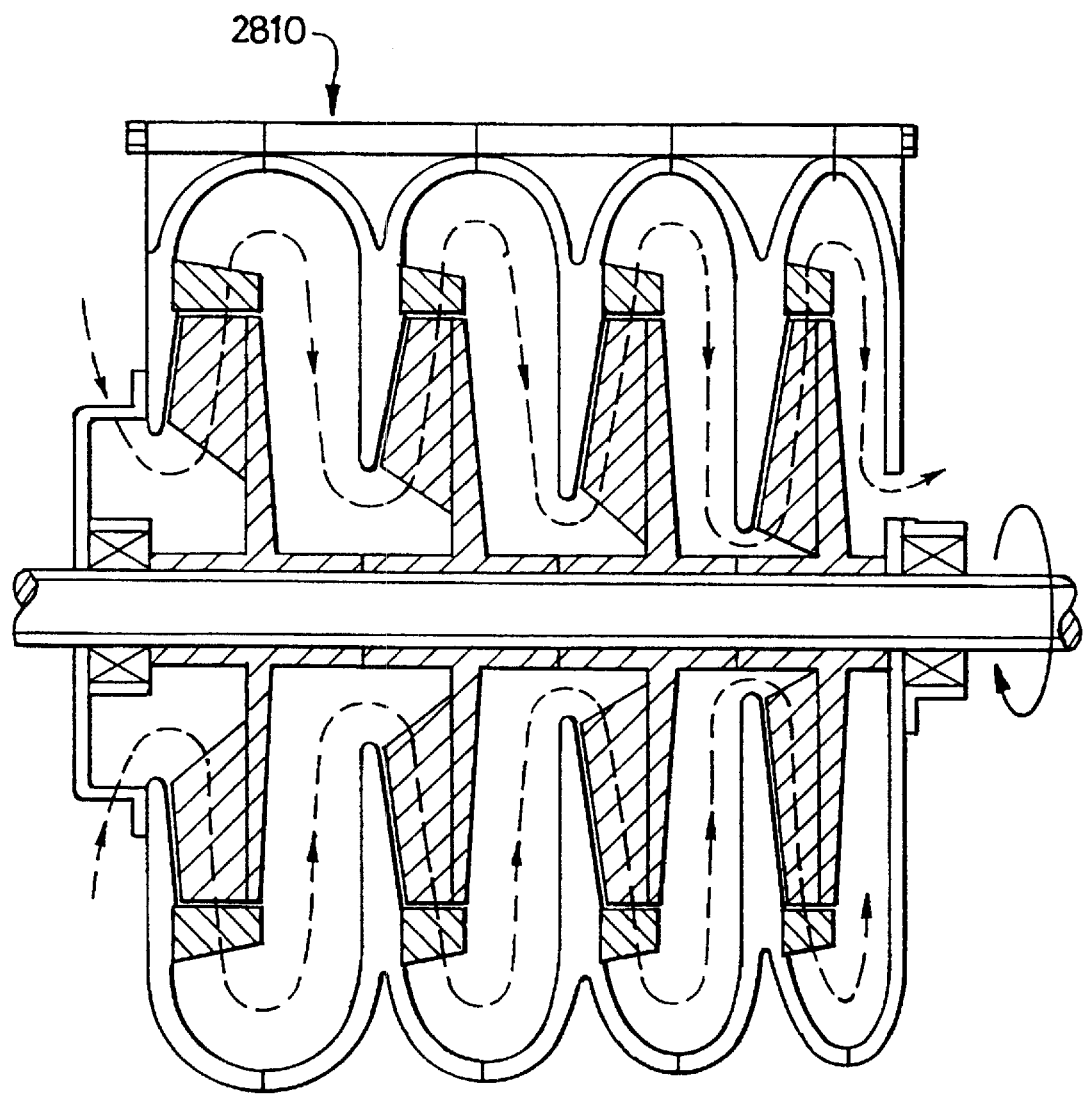
FIG. 28 shows details in cross-section of a compressor that is suitable for use, for example, with the engine of FIG. 1.
Figure 32:
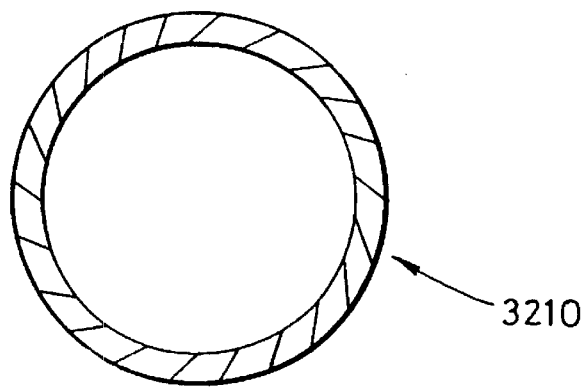
FIGS. 32 and 32a show elevational and sectional views of a diffuser ring of the compressor of FIG. 28.
Figure 32A:

A multistage compressor 2810 is shown in FIG. 28. Such a compressor might be incorporated into the embodiment of FIG. 1. An impeller 2910 suitable for use with the compressor 2810 is as shown in FIGS. 29 and 30. The impeller 2910 is designed such that the same impeller casting can be used for all stages in the compressor. The largest size is the base for all of the impellers and they are machined to the required profile as indicated by the dotted lines in FIG. 30. Similarly the compressor 2810 may comprise a housing made up from identical units 3110 as shown in FIG. 31 which are machined to the required depth profile, also indicated by the dotted lines and then bolted together to form various volute chambers within which the impellers 2910 are contained. A diffuser baffle 3210 of the compressor 2810 is shown in FIG. 32. Again this is based on the largest unit, and is machined to fit into the appropriate volute, (see dotted lines in FIG. 32a. The advantage of this method of construction is that it is extremely flexible and cost effective. The compressor 2810 is modularly built from only three castings and can be designed for different stage compression ratios and for as many stages as is necessary.

If the impeller and volute castings are made of temperature-resistant materials, such as stainless steel or nickel steel for the impeller, the compressor design may also be used for pre or post turbo-chargers or for turbo assistance units. This again extends the application of the design.

The design of the rotor and stator of this engine may also be used as an inefficient compressor if the rotor is driven.

Cooling

Figure 33:
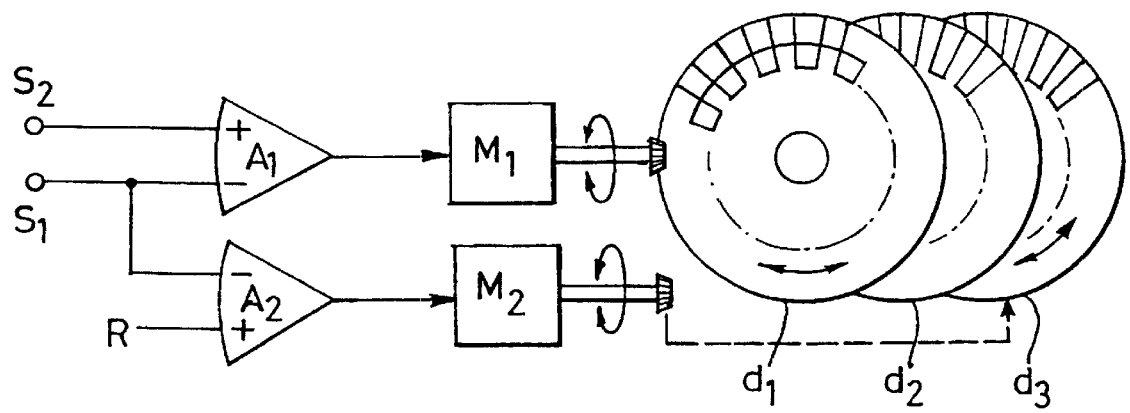
FIG. 33 is a diagram of a system for measuring and controlling temperatures of components of an engine embodying the invention.

The rotor and stator temperatures are measured by sensors s1 and s2 shown in FIG. 33. Signals from the sensors are fed to a differential amplifier A1 whose output drives a servo-motor m1 which in turn moves a first slotted disc d1. The first slotted disc d1 lies against a second slotted disc d2. This diverts the airflow from stator to rotor and vice versa, so that the temperature differential between them is minimised. A further amplifier A2 may be provided connected to one of the sensors s1 and to a reference voltage R. The second amplifier A2 drives a second servo-motor m2 which in turn moves a third disc d3 that overlays the other two discs d1,d2. This has the effect of controlling the overall airflow, so controlling the overall temperature of rotor and stator.

Sealing Bars

Where sealing bars are provided in a design, e.g. the expanding jaw configuration (as discussed below), the bars may be profiled so that they are undercut marginally for the section that passes over the rotor chambers. The bars thus rest only against the rotor shoulders, which are not subjected to as high temperatures as the central chamber section of the rotor. The bars can be made of cast iron that has self-lubricating properties. End sealing rings may be installed but add to the complexity of the design. The majority of potential gas escape is across the chamber length.

Engine Configurations

Figure 34A:
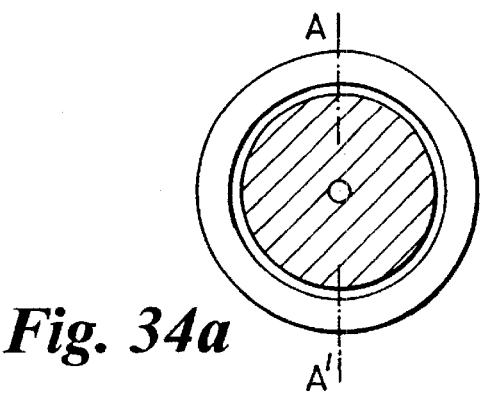
FIGS. 34 to 44 show, in longitudinal and transverse cross-section, various alternative configurations of engines embodying the invention.
Figure 34B:
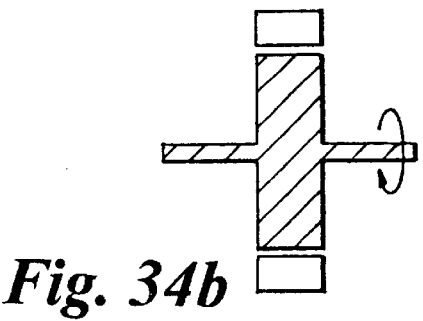
Figure 35A:
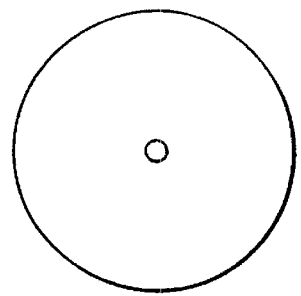
Figure 35B:
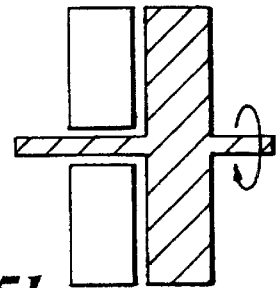
Figure 36A:
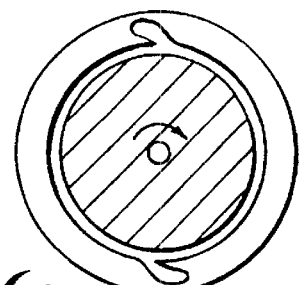
Figure 36B:
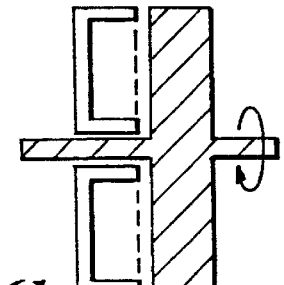
Figure 37A:
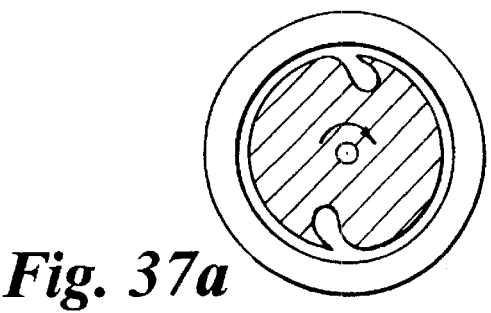
Figure 37B:
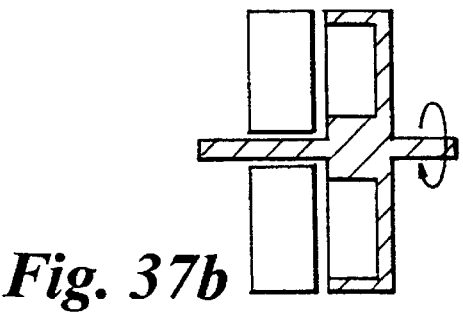
Figure 38A:
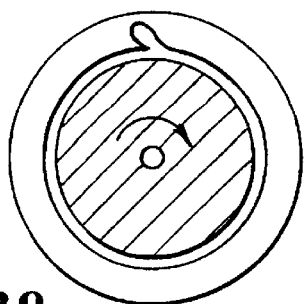
Figure 38B:
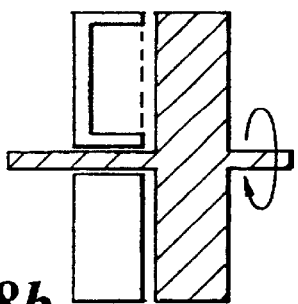
Figure 39:
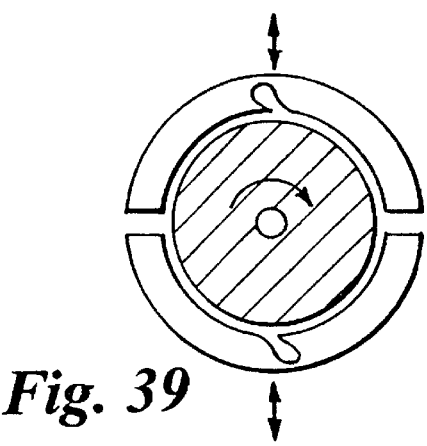
Figure 40:
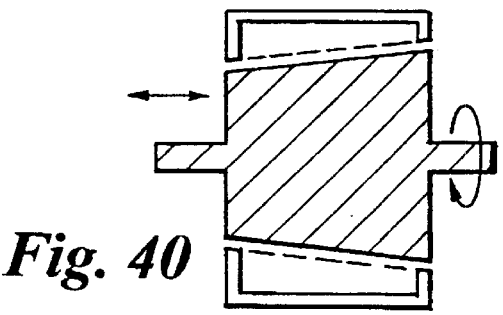

Many possible combinations and configurations of the rotor and stator assemblies are possible. Some of these are listed below with the corresponding outline figure references:

Internal engine configurations:
1. Concentric stator and rotor, or stators and rotors. FIGS. 34a and 34b)
2. Axial stator and rotor, or rotors and stators. FIGS. 35a and 35b)
3. Mother (combustion) chamber or chambers in the stator or stators. FIGS. 36a and 36b)
4. Mother chamber or chambers in the rotor or rotors. FIGS. 37a and 37b)
5. Unopposed chambers in the rotor and stator or rotors and stators. FIGS. 38a and 38b)
6. Opposed chambers in the rotor and stator or rotors and stators. FIGS. 39)
7. Expanding jaw sectioned stator or stators for concentric formats. FIG. 39)
8. Tapered stator and rotor or stators and rotors for concentric formats. FIG.

Figure 41:
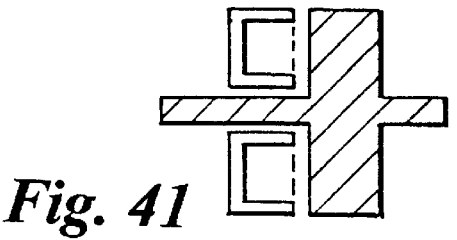
Figure 42:
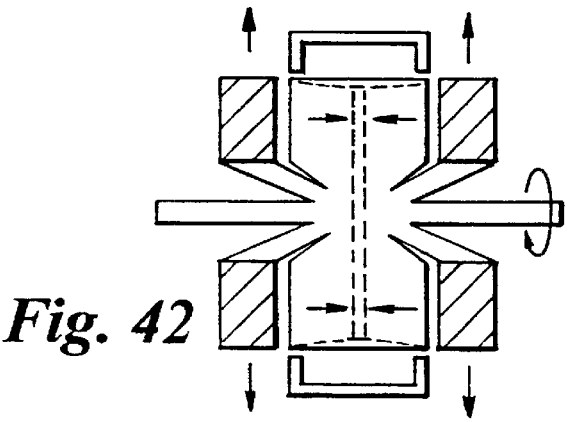
Figure 43A:
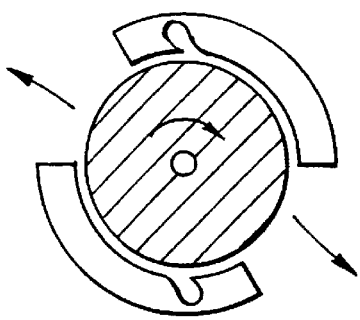
Figure 43B:
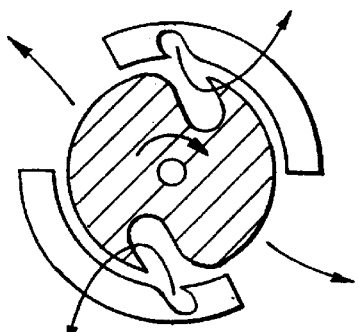
Figure 44A:
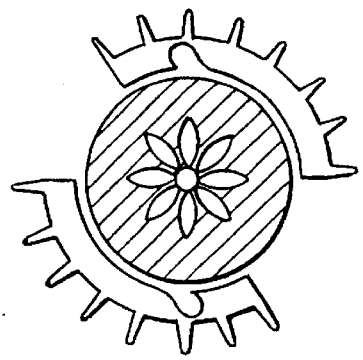
Figure 44B:
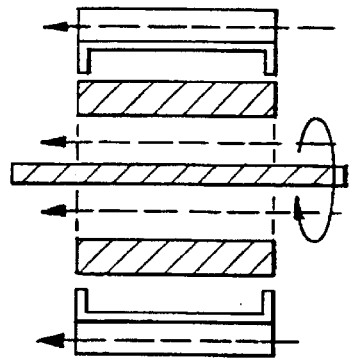

9. Sliding rotor or stator, or rotors and stators for axial formats. FIG. 41)
10. Compensated rotor bob weight for concentric formats FIG. 42)
11. Rotor only or rotor and stator exhausting FIGS. 43a and 43b)
12. Gas cooled or fluid cooled rotor and stator, or combinations FIGS. 44a and 44b)

External Engine Configurations

There are many external configurations of the engine possible. One of the simplest, and several variations, have already been described. A list of some of the more important external configurations will be described below. A special syntax has been developed to describe these configurations, the grammar of which precedes the list. Inter-stage cooling between compression stages has not been included so as to limit the number of examples. This can be applied at any juncture between two or more compressors, or between the stages within a multistage compressor set. In order to achieve the compression ratio needed, compressors will normally be multistage. Centripetal or axial compressors are both able to be used:

Grammar:
  i) The working fluid flow is left to right. Turbine expansion determines the sequence.
  ii) Compressors are denoted C, turbines are denoted T and are separated by commas in a set.
  iii) Compressor and turbine sequences are identified by subscripts.
  iv) Compressor-turbine sets carry the same subscripts.
  v) Cascaded compressors carry the same dot products, as do turbines.
  vi) The power output turbine is in bold type.
  vii) Isolated turbines are preceded by a plus sign and are bracketed with dual feed turbines.
  viii) An assistance turbine on the same shaft is in italics.
  ix) Switching is indicated thus I.

Figure 45:
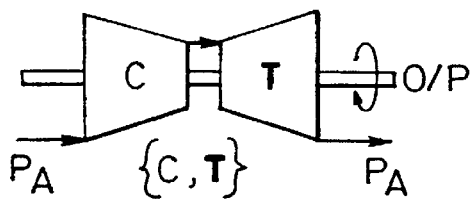
Figure 46:
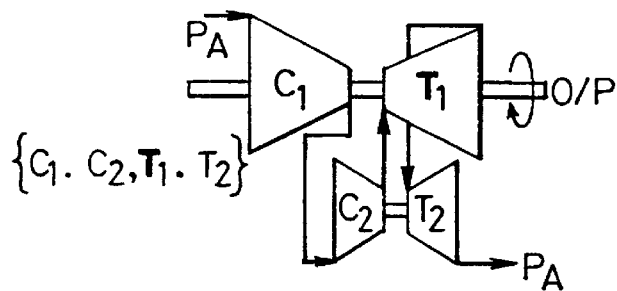
Figure 47:
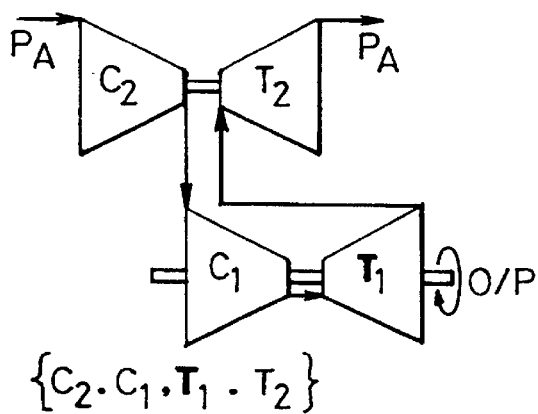
Figure 48:
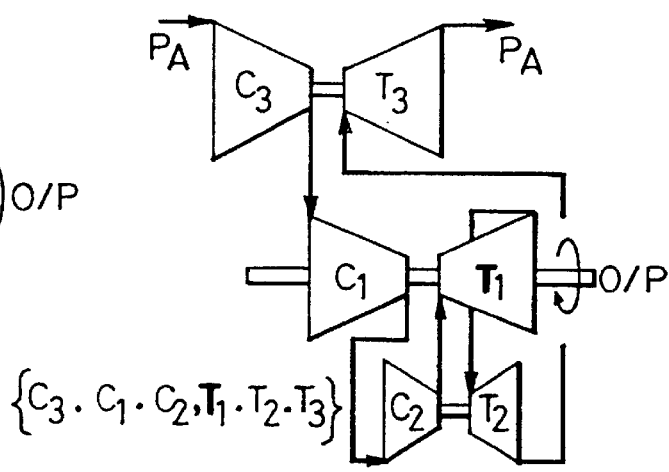
Figure 49:
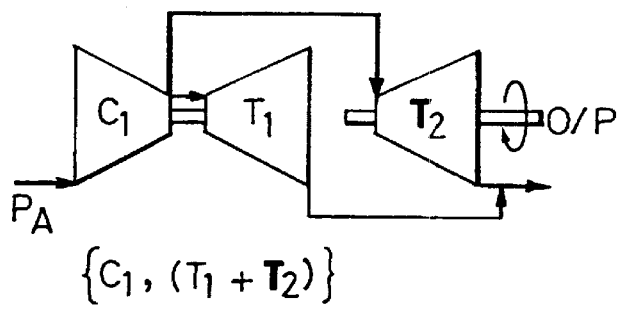
Figure 50:
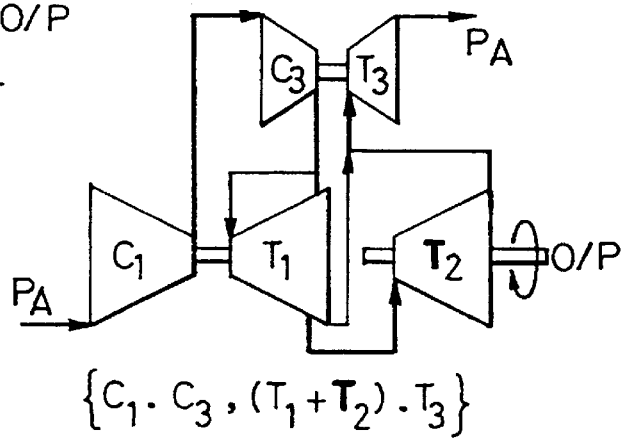
Figure 51:
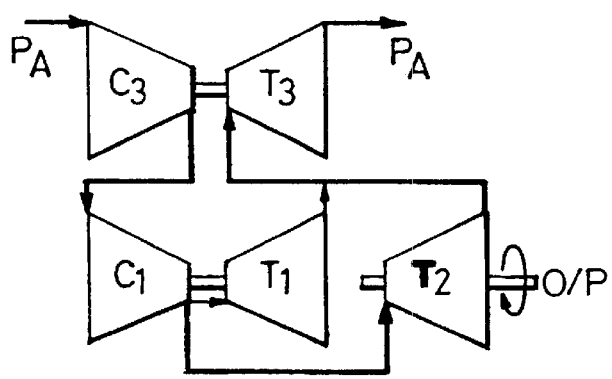
Figure 52:
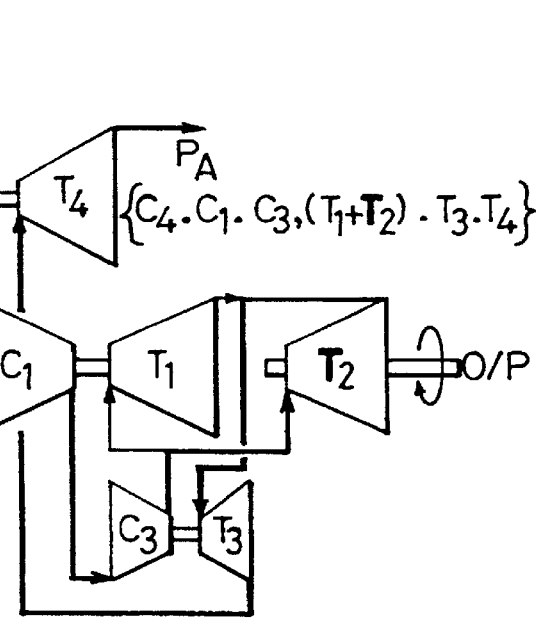
Figure 53:
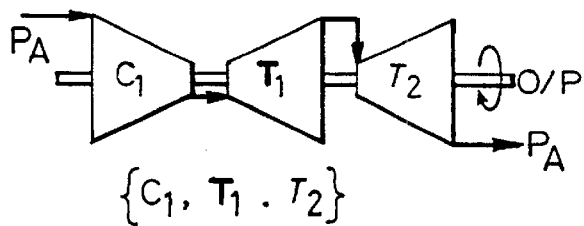
Figure 54:
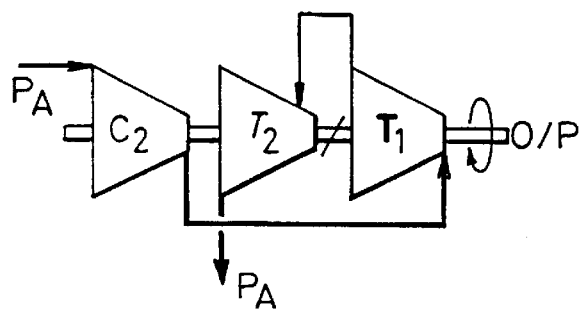
Figure 55:
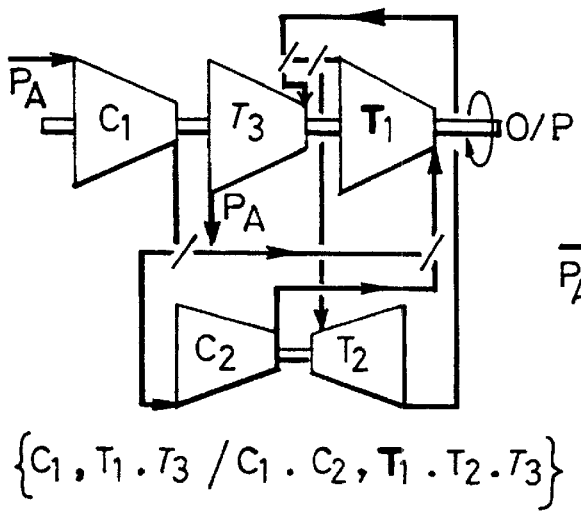
Figure 56:
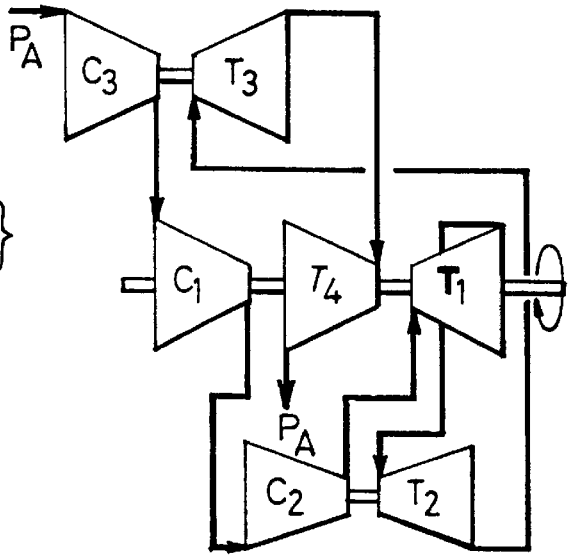

External Configurations:
1. {C,T} Single spool compressor turbine set with output from the turbine. FIG. 45)
2. {C1.C2,T1.T2} Single spool compressor turbine set with post-compression turbo-charging. FIG. 46)
3. {C2.C1,T1.T2} Single spool compressor turbine set with pre-compression turbo-charging. FIG. 47)
4. {C3.C1.C2,T1.T2.T3} Single spool compressor turbine set with pre and post compression turbo-charging. FIG. 48)
5. {C1,(T1+T2)} Compressor turbine set with isolated main output turbine. FIG. 49)
6. {C1.C3,(T1+T2).T3} Compressor turbine set and isolated main output turbine with post-compression turbo-charging. FIG. 50)
7. {C3.C1,(T1+T2).T3} Compressor turbine set and isolated main output turbine with pre-compression turbo-charging. FIG. 51)
8. {C4.C1.C3,(T1+T2).T3.T4} Compressor turbine set and isolated main output turbine with pre and post compression turbo-charging. FIG. 52)
9. {C1,T1.*T2*} Single spool compressor turbine set with post expansion turbine assistance. FIG. 53)
10. {C2,T1.*T2* C2,(T2+T1)} Single spool compressor turbine set with post expansion turbine assistance and switching to isolated main output turbine. FIG. 54)
11. {C1,T1.T3 C1.C2,T1,T2,T3} Compressor turbine set with post expansion turbine assistance supplemented by switched post compression turbo charging. FIG. 55)
12. {C3.C1.C2,T1.T2.T3.T4} Compressor turbine set with post expansion turbine assistance and pre and post turbo-charging. FIG. 56)

External Combustion Engine

In a further embodiment of the invention, combustion of fuel takes place externally of the unit. The invention may be applied to external combustion units such as steam engines, or pre-heated hot gas engines. As shown in FIG. 57 the engine design is basically the same, except that no compressor stage is employed. Steam or hot gases are raised in a boiler B (or a producer unit P). Additionally, as the working temperatures are lower, the constraints on design are much less stringent in many respects, particularly in the realm of sealing and thermal expansion compensation. With steam as the working fluid, water may be recovered by use of a condenser C:

Engine Design Permutations

It can be seen that between the internal configuration (12 basic formats); the gap control regime (3 basic formats) and the external configuration (12 basic formats), there are over four hundred possible, simple permutations of the basic design options.

Diesel Like Version

A diesel like cycle version of the engine differs in that higher compression ratios are employed, and that, as described earlier, there is no maid chamber, or at most a smaller maid chamber. If this were present or too large it would remove part of the working fluid (burning gases), prematurely. The diesel cycle requires injection of fuel throughout the power stroke equivalent. Hence it is important that not too much volume of the gases is removed too early from the combustion chamber during the initial part of the burn process. Fuel injection may be into the combustion chamber directly, or into a pre-burn chamber as in light power diesels. In all cases however the diesel engine cycle equivalent in this engine is transformed into a high speed, high power and high efficiency cycle, particularly if the horizontally opposed configuration is employed; which can eradicate much of the diesel 'knock' noticeable with conventional reciprocating diesel engines.

Overall Engine Appearance and Assisted Cooling

An engine design similar to that shown in FIG. 7 is shown in FIGS. 58a to 58f.

The cross section of this engine across the rotor r and stator s assemblies shows fourteen rotor and fourteen stator chambers. This includes the rotor and stator power exhaust ports, for each of the cylinder equivalents of this horizontally opposed configuration. Each 'cylinder' hence provides 196 separate power impulses during the power stroke equivalent. Carbon brush lubrication is provided at cb. Sealing bars are provided on the last chambers of the stator at sb. The stator assembly is made of two halves that conform to the 'expanding jaws' design discussed above. In FIG. 1 a cross-section through the complete engine is shown, with its four-stage centripetal compressor unit 110. The engine is an air-cooled Otto-like unit. Air passes through the rotor cooling fluid ducts 236 and over the stator cooling fins 334, attached to the stator assemblies 310. Additional cooling is achieved when required, as at maximum engine output, by injecting a fine water spray into the air stream for example, at the air intake 100, or downstream therefrom.

A turbine assistance unit 118 is provided on the same shaft, it is powered from the stator exhaust via the rotor exhaust port. This is fed by means of a venturi 144, which increases the velocity of the exhaust gases hence matching them to the impeller rate. If a fuel burner were to be included in the configuration, a full gas turbine effect would be produced. As the turbo assistance impeller is cast from the same moulds as those of the compressor, the air passage sequence through the compressor is reversed to that which might be thought more logical. However with the inclusion of pre and post turbo-chargers (next paragraph) this is of no consequence, since extra piping has been provided to feed these units.

Additional pre and post turbo chargers may be fitted to this configuration. The unit is a {C1.T1.T2} turbo-assisted type. If pre and post turbo charging is added, it is defined as a {C3.C1.C2,T1.T2.T3.T4} configuration with the turbine expansion sequence of 'main' to 'post' to 'pre'to 'assisted'.

There are two exhausts in the stator and the possibility of two in the rotor, if the rotor is configured to exhaust the stator. In this latter case the exhausts may operate independently on the turbo-chargers. New exhaust configurations are possible such as {C3.C1.C2,T1.t2.T2.T3}, or {C3.C1.C2,T1.t2.t3.T2}, where the lower case indicates a rotor exhaust. In the former example, the assistance turbine alone is driven by the rotor exhaust, as has been described above. In the latter example the post and pre-chargers are driven by the rotor exhaust whilst the assistance turbine alone is driven by the stator exhaust. The syntax may further identify between multiple stator exhausts, by further subscripts; {$C,2.C1.i.C_22,T1.t2.T_12.T_22$} is the same as the first configuration, but defines that each stator exhaust separately drives a turbo charger and the common rotor exhaust drives the assistance turbine. This identifying method may operate over as many exhausts as necessary.

It should be noted that turbo-assistance provides additional 'free' exhaust power to drive the multi-stage compressor. Turbo pre-charging allows additional altitude to be achieved in aero-engine applications again free from the exhaust. Turbo post-charging provides an additional level of compression, again free from the exhaust. This is particularly useful in that the compressor can be made small and to revolve at a higher revolution rate than the main engine. These latter two ensure a more even compression performance over the engine speed range. Inter-cooling can also be added to the engine between the various compression stages to increase volumetric efficiency. The definition for the illustrated unit in FIG. 7 then becomes: {$C_12.i.C1.i.C_22, T1.t2.T_12.T_22$} for two inter-stage coolers.

Considerations Relating to Design of the Expansion Chambers Chamber shape, 'cupulets', 'cupulet tuning', 'aperture tuning,' 'packing' & 'ventricles':

In FIG. 59 the cross sectional appearance of the rotor expansion chambers is shown. As has been described earlier, these are the shape of an old-fashioned style retort, with a thinning neck section 5910 attached to a bulbous body 5912. The purpose of the neck 5910 is to accelerate the gas efflux and hence create maximum impulse levels upon the rotor 210. The shape of the bulbous body 5912 is designed to minimise heat loss by providing the maximum volume possible for a given surface area.

The energy transfer mechanism is that of 'gas vectoring' when gas/fluid is transferring from stator chamber to rotor chamber. It is that of Newtonian reaction when gas/fluid transfers from rotor to stator.

In FIG. 59 it can be seen that the gases entering a chamber, when it is receiving fluid, rotate in the bulbous cavity 5912. This means that some of the gas energy remains in the gas rotation. This remaining energy may be transferred as additional impulse power by including devices 6010 known as cupulets to the gas facing edge in the chamber. See FIG. 60. The cupulets 6010 break up the gas flow and thereby extract most of the velocity energy of the impinging gas. Their design is similar to that of half an arrowhead. Each cupulet includes a cup section that impedes incoming gas that faces on to it, and a ramp section that allows exiting gas to escape without much impediment.

The consequence of extracting this velocity energy is that when the chamber next is a donator chamber, the exit velocity is reduced. This in turn means that the subsequent kinetic energy is reduced as is the impulse power and the gas is delivered over a longer time period. Thus the cupulets 6010 may be used particularly in the early stages of cadence-recursive expansion to slow down and match entering and exiting gas velocities to the 'exposure' time that these early chambers are subjected to. The technique is termed cupulet tuning.

Also by using different aperture widths (in particular, reducing the widths) for the earlier chambers in the expansion sequence, and substantially wider apertures for the latter, larger chambers, the aperture times can be matched to the gas velocities. Hence the gas fills a chamber or empties it throughout the whole of the 'exposure' period. The objective here is to ensure that up to maximum engine speed, full chamber filling and emptying still occurs.

The general effect between cupulet and aperture tuning is one of broadening the engine power band. At lower engine speeds and lower power levels, the gas velocities tend to be lower. The aperture tuning effect predominates as the cupulets play less of a role. At higher engine speeds and power levels, the gas energies and hence velocities are higher. Under these conditions the cupulets 6010 are correspondingly more disruptive to the gas flows, reducing the velocities accordingly. The components of this can be seen in FIG. 7.

As a consequence of the retort shape, and the fact that chambers 232 have to be closely spaced, particularly in the rotor, the neck 5910 is normally to one side of the chamber body. In the rotor 210, the chamber packing in conjunction with the rotor curvature, results in mid-numbered chambers deviating from the ideal and having 'S' shaped formats in cross section. Additionally the rotor 210 carries air cooling chambers 236 or 'ventricles' which are positioned under and around the rotor chambers. See FIG. 7).

Chamber Dimensions

As was described earlier, the chamber aperture widths are smaller for the first chambers. This excludes the mother (combustion) and primary chambers, as they are proportionally larger. For constant velocities of gas, the aperture width should be proportional to the chamber volume. However, practical design constraints normally mean that this ideal has to be departed from.

Computer modelling of the expansion process shows that not only should the primary chamber 234 be around 30% of the mother combustion chamber 316 in an Otto-like cycle, but also the subsequent stator and rotor chambers should have volumes that increase in an exponential-like manner. The first expansion chamber 232 after the primary chamber 234 should be between 2% to 5% of the combustion chamber 316. Also to maximise power output the chamber lengths should be prescribed to normally a fixed ratio of length to volume of any chamber volume.

The length of a chamber, for any given shape of chamber, determines how much heat energy is lost by gas while in the chamber. The ratio of the length to the chamber volume and hence the diameter should remain constant. This means that the chamber length should increase with the volume. This is termed 'chamber length adaptation'. This adds another complication to the rotor/stator designs and hence complicates manufacture. It also means that the smaller chambers will take up more of the rotor/stator perimeter, because the chamber diameters will be bigger than If a constant length, as set by the combustion chamber 316, had been used. The incorporation of length adaptation is thus not so straightforward. It is not included in the design shown in FIGS. 7, for the above reasons.

A more detailed FIGS. 58a to 58f is shown which is a concentric horizontally opposed format with two sets of stator and rotor chambers and the mother chambers in the stators. The stator is of the expanding jaw configuration. Both the rotor and stator assemblies exhaust. This type of design provides two power stroke equivalents per revolution per mother chamber, compared to a single cylinder four stroke reciprocating engine's one power stroke per two revolutions. This means that this design will theoretically have a power output level 4n, where n is the speed ratio at maximum revolutions between the rotary design and the reciprocating design.

The expanding jaw configuration provides simplicity in transfer chamber arrangements. In FIGS. 58a to 58f, the power stroke can be seen in operation. In 58a the fuel gas mixture is transferred in to the mother chamber, the equivalent of induction. In FIG. 58b it is ignited. In FIG. 58c the first chambers are engaging; the power stroke commences. In FIG. 58d, the first rotor chamber is exhausting. This is a power exhaust. In FIG. 58e, the first stator chamber is exhausting. Again this is a power exhaust. In FIG. 58f both rotor and stator exhausts are coupled and the cycle is ready to be repeated.

Combustion Chamber Choking

If an engine embodying the invention is not required to produce the maximum power theoretically obtainable from the combustion assembly, its efficiency may be improved by so-called combustion chamber choking. This is achieved by inserting a sleeve into the combustion chamber 316 in the stator casting 320. The sleeve is generally C-shaped, having an outer surface of generally the same cross-section as that of the combustion chamber 316. Holes are formed in the sleeve where required to enable spark plug and/or injectors or other apparatus to penetrate into the chamber.

The effect of the sleeve is to reduce the volume of the combustion chamber, but otherwise to leave its construction and function unaltered. This produces a substantially direct trade-off between a loss of maximum power and a gain in fuel efficiency.

Flow Restriction in the Compressor

As was discussed above, some embodiments permit portions of the compressor to be selectively closed. One particular benefit of doing this is to prevent surging of air flow in the compressor.

It is recognised that a centrifugal compressor typically has a pressure output that rises to a peak as rotor speed increases, up to a maximum pressure value, whereafter, as rotor speed continues to increase, the pressure falls off. Moreover, at low speed, the compressor can present a cyclically varying load on the input shaft, which can cause a cyclic variation in the speed of the input shaft; a phenomenon known as "surging". It has been found that the variation in pressure and the occurrence of surging can be minimised by control if the air flow through the various compressor stages. In general, an aim of such control of air is to ensure that each stage of a multi-stage compressor, or each of several parts of a multi-stage compressor delivers as near as possible a steady output, and operates as efficiently as possible.

Figure 61:
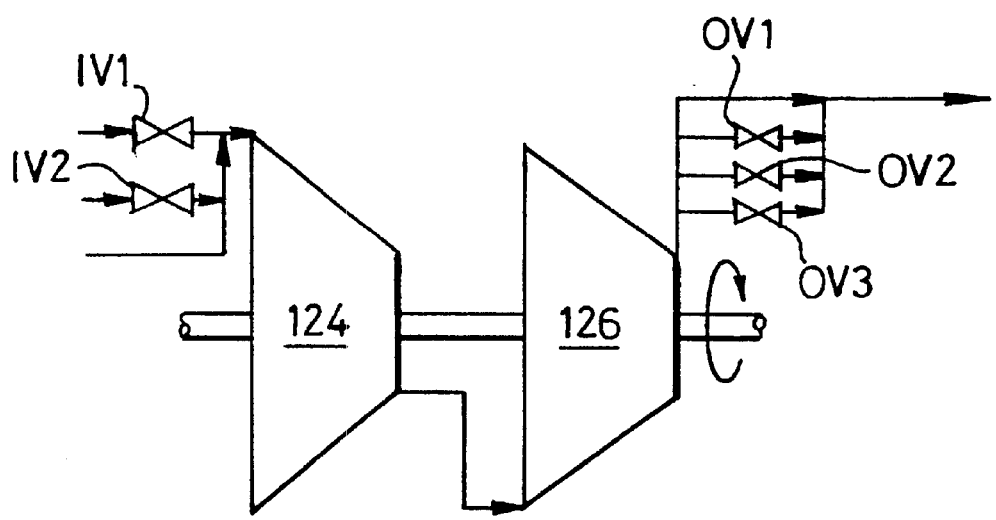
FIG. 61 shows diagramatically a compressor having inlet and outlet control valves.

With reference to FIG. 61, there is shown a diagrammatic representation of the embodiment described above incorporating the modifications shown in FIGS. 1a, 3a, 3b and 4.The inlet duct 100 is provided with air control flaps 1110 as shown if FIGS. 3a, 3b and 4. These can be considered to act as inlet valves IV1, IV2 for segments of the first compressor rotor 124. At low speeds, all of the flaps 1110 are closed, so that air can flow into the rotor 124 through the section of the ring 1112 which does not carry flaps. Thus, a small amount of air is handled efficiently by a small segment of the rotor 124. As speed increases, further flaps 1110 are opened (effectively opening further valves) until the entire rotor 124 is operational. Similarly, the output from the second rotor at low speed is taken from just one part of the volute with the output valves OV1, OV2 and OV3 being closed. As speed increases, these valves are progressively opened so increasing the extent to which the second rotor 126 is used.

Figure 62:
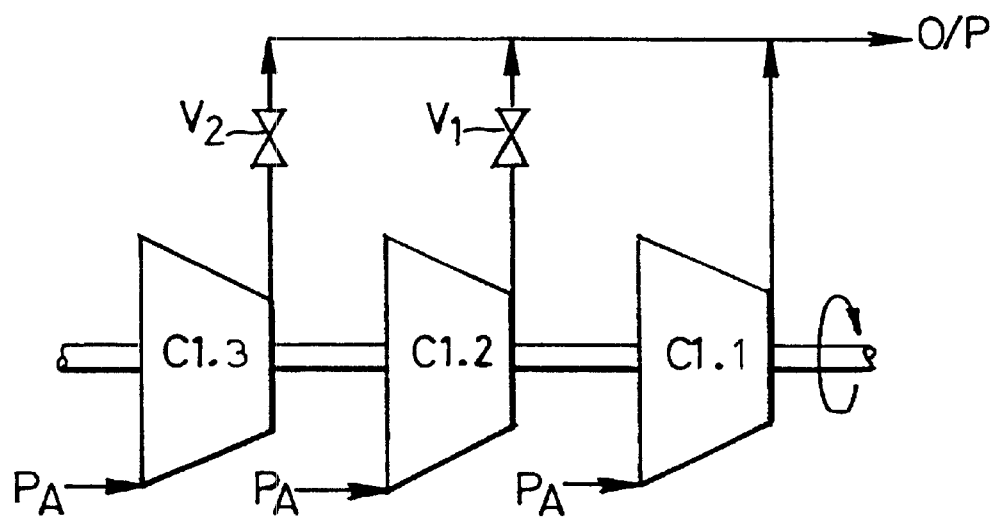
FIG. 62 shows diagrammatically a compressor including multiple (optionally modular) units with outlet control valves.

An alternative arrangement is shown in FIG. 62. In this arrangement, three similar single-stage or multi-stage compressors C1.1, C1.2, C.3 are connected in parallel. The output of two of these compressors is controlled by a valve V1, V2 that selectively allows or prevents air to flow from the compressor. At low speeds, and low air volumes, both valves V1,V2 are closed, and air flow is handled by just one of the compressors C1. As air flow increases, the valves V1 and V2 are opened in turn, thereby sharing the air flow between the compressors C1, C2, C3.

Both of these arrangements, amongst other possibilities, can be set up to ensure that the air flow through each compressor, or through each rotor section, is as near as possible optimal.

Mathematical Design Equations

Figure 65:
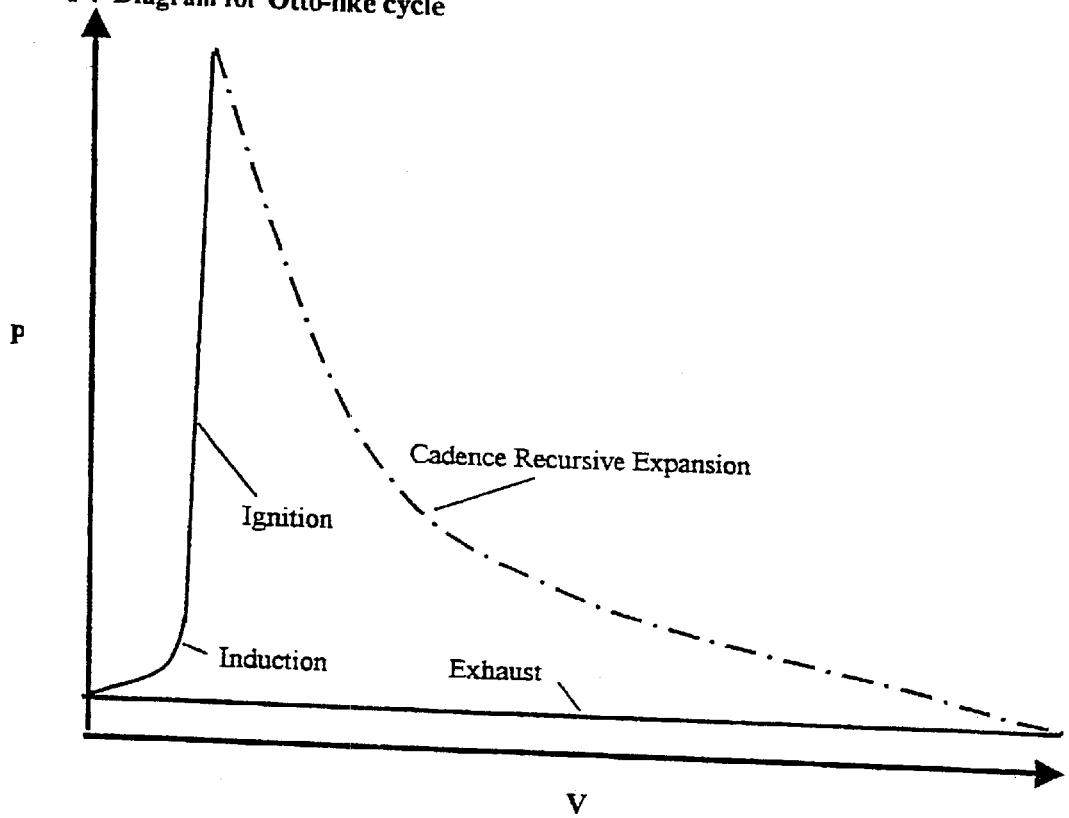
FIGS. 65 and 66 are PV diagram graphs that represent the thermodynamic cycle for the Otto similar and Diesel similar cycles, respectively.
Figure 66:
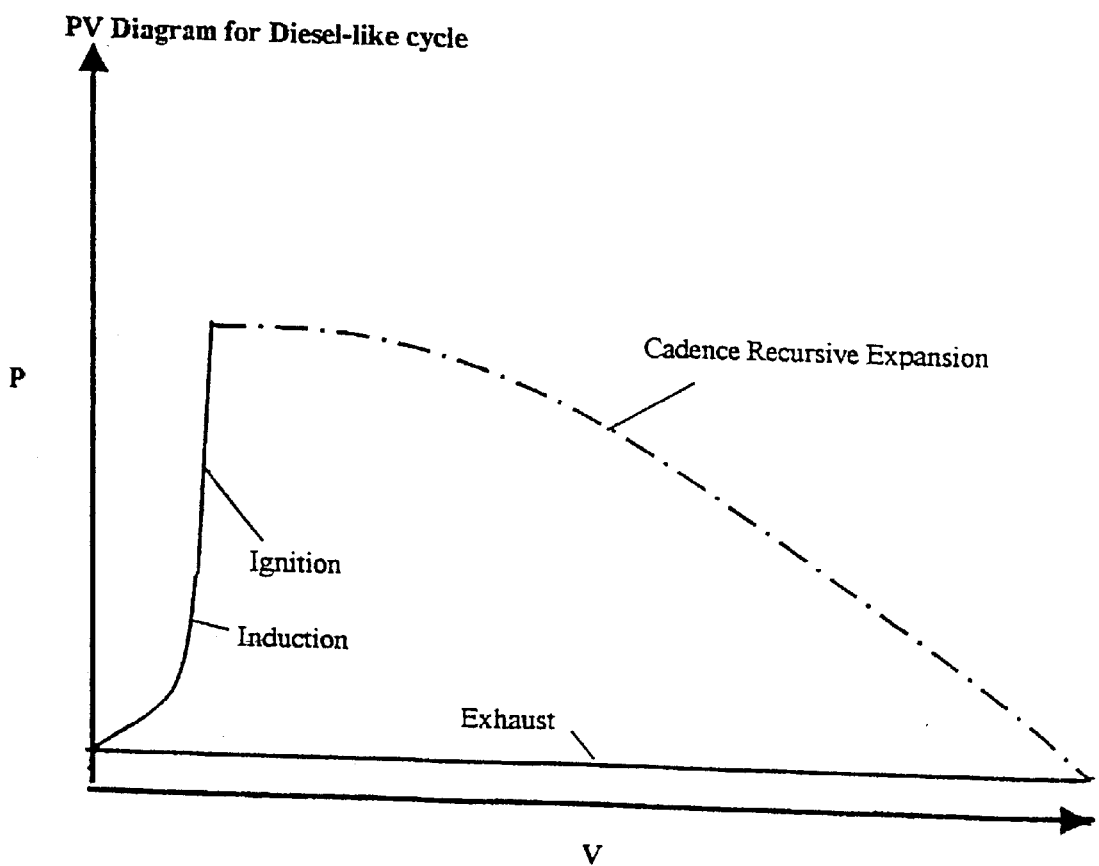

The cadence recursive expansion obeys a stepped adiabatic differential process. This is defined by the equation:

$$Pn \cdot m = Pn - 1 \cdot m - 1 + \frac{(Pn - 1 \cdot m - Pn - 1 \cdot m - 1)Vm\gamma}{(Vm + Rn - m + 1)\gamma}$$

where: $V$ = stator volumes $R$ = rotor volumes $\gamma$ = ratio of specific heats $m$ = step count $fi$ = stator chamber number Thermodynamic Cycle:

The thermodynamic cycle is represented in the PV diagrams in FIG. 65 (graph 1) for the Otto similar cycle and FIG. 66 (graph 2) for the Diesel similar cycle. The differences in the new cycles is in the hot-end 'cadence recursive' expansion process.

Figure 67:
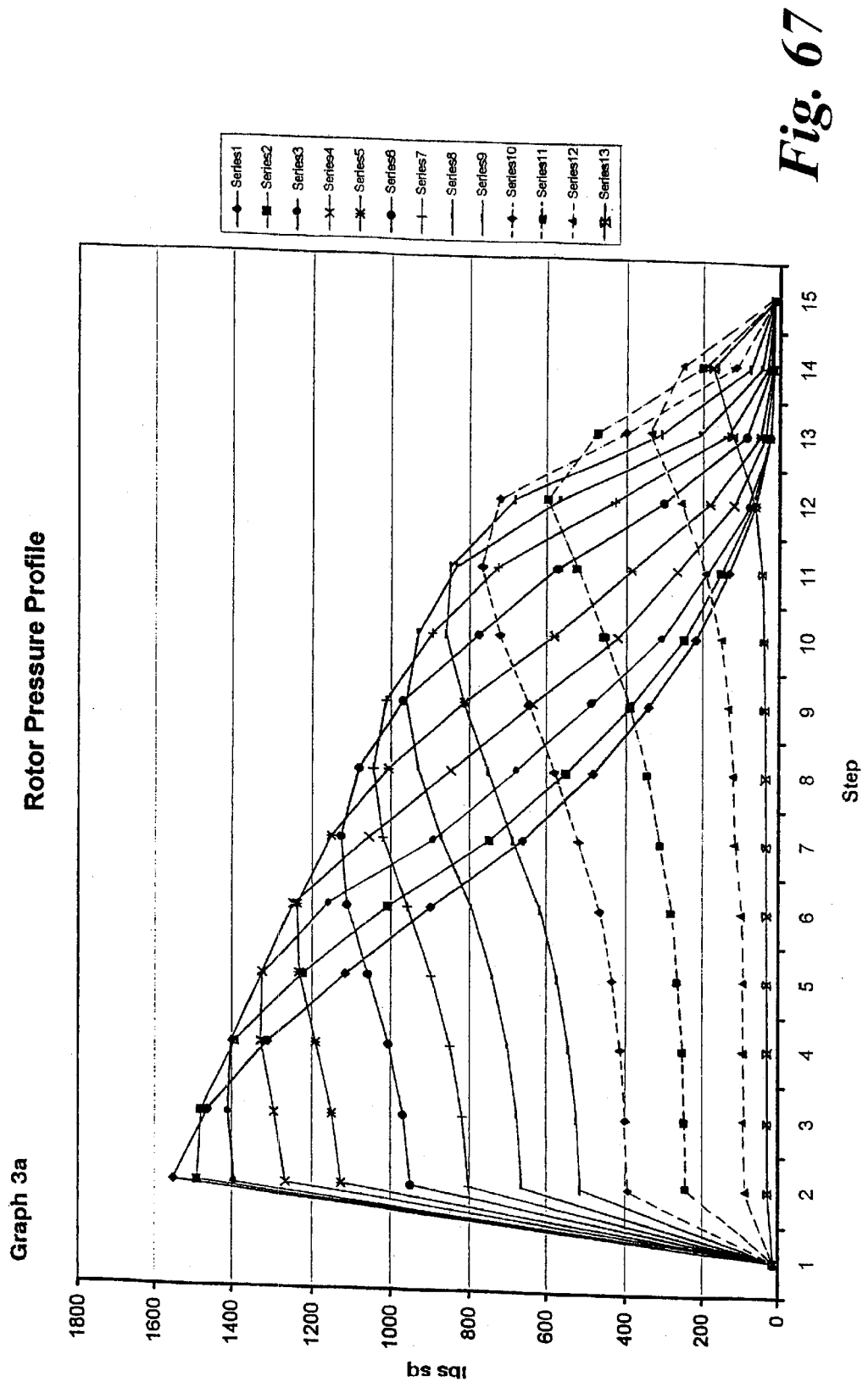
FIGS. 67 and 68 are pressure graphs associated with FIG. 63 for the rotor and stator components, respectively; and, FIG. 69 is a graph that illustrates Ratio of Length to Adiabatic Area vs. Length for a Retort Shaped Chamber.
Figure 68:
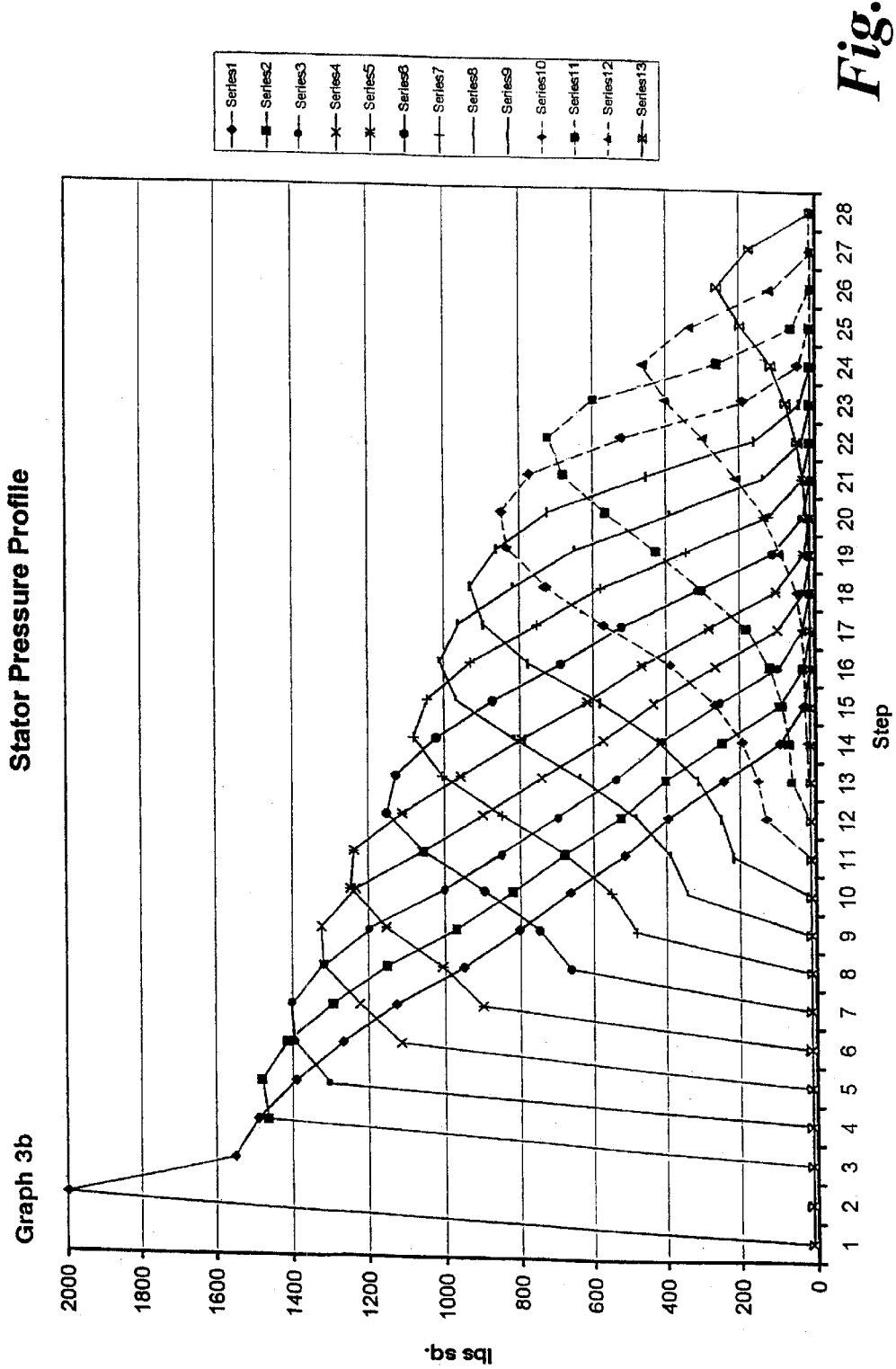

Cadence-recursive Expansion Pressure Profile:

In FIG. 63 (Table 1) a typical expansion pressure profile is shown, with the associated graphs shown in FIGS. 67 and 68 (graphs 3a and 3b) for the rotor and stator components.

The Chamber Optimisation Equation is:

For a 'retort' shaped chamber the output power is defined by the formula:

$$P = \frac{K \cdot L}{A^{(\gamma/\gamma-1)}}$$

Figure 69:
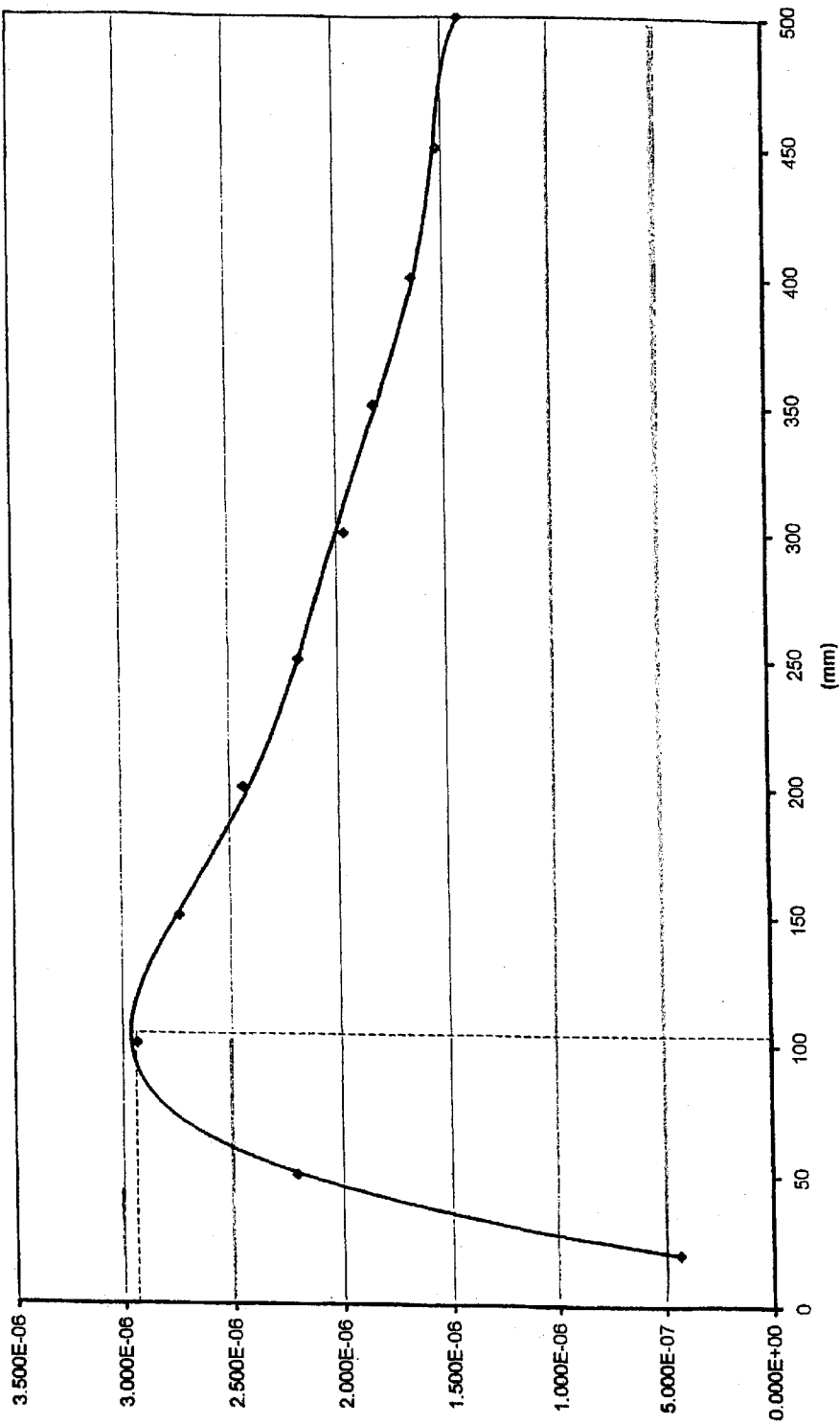

Where:
K=constant of proportionality
L=length of the chamber
$A^{(\gamma/\gamma-1)}$=adiabatic surface area of the chamber This produces a curve as shown in FIG. 69 (graph 4).
The retort nozzle design equation is:

$$V = \sqrt{2\frac{PA_1}{\rho A_2}}$$

Where:
V=gas or fluid velocity
P=differential pressure acting
A1=area at the entrance to nozzle
A2=area at the exit off the nozzle
ρ=density of the gas or fluid Engine Power Equations:

$$I = \cos\phi \cdot \frac{V^2}{2dA}\sqrt{PK\rho}$$

Where:
I=impulse acting on a single chamber=angle of incidence of the acting gas or fluid
V=volume of gas or fluid transferred (volume of chamber)
P=differential pressure at start of transfer of gas/fluid
K=ratio of the nozzle entrance to nozzle exit areas
D=density of the gas or fluid
d=deceleration distance gas or fluid travels
A=area of nozzle entrance
And $$It = S \cdot rps \cdot \sum_1^n I$$

Where:
It=total impulse per second
S=number of power 'strokes' per revolution
rps=revolutions per second
n=number of chamber interactions (usually n1.n2, where n1 is the number rotor chambers and n2 is the number of stator chambers)

Unequal Compression and Expansion Ratios:

Unlike a normal reciprocating engine, the compression ratio and expansion ratios of this engine may be different, since compression and expansion are carried out independently, not in the same cylinder, as is the case of a reciprocating engine. This means that not only does a higher compression ratio mean greater efficiency for the engine, so does higher expansion. If the compression and expansion ratios are matched then the engine is said to be 'of unit ratio'. If the expansion ratio is greater than the compression ratio, then the engine is said to be 'over ratio'. If it is less it is 'under ratio'.

The normal constraints of pre-ignition apply to the compression ratio. There is no theoretical limit to the expansion ratio except that imposed by practical engine size and whether the exhaust gases are to be used for the various forms of pre, post or assisted turbo charging. If some turbo-charging is desired, then the engine is made either of unit ratio or marginally over (e.g. 1.2 to 2.0).

WR=ER/CR

Where: WR = working ratio or 'ratio'
ER = expansion ratio
CR = compression ratio Design Rules for an Efficient Engine:
1. The compression ratio shall be as high as possible. The limit is before the onset of pre-ignition in the Otto-like cycle. (Otto-like typically 9:1 to 12:1; Diesel-like 22:1 to 35:1)
2. The expansion ratio shall be as high as possible commensurate with engine size and exhaust loading of turbo charging I assistance. This is expressed relative to the compression ratio and is termed the working ratio. (Typical ratio range is 1.2 to 2.0.)
3. Engine running temperatures should be as high as possible commensurate with material strengths. (Typically 200° C. to 400° C.)
4. The ignition, or mother chamber and other chambers shall be retort shaped with high nozzle ratios commensurate with matching gas speeds with engine rotation rates. (Typical range is 2.0:1 to 4.0:1.)
5. The ignition (mother) chamber and other chambers shall have a length which is as large as possible commensurate with loss of heat. (Typical is 10 cm for a 100 ml volume chamber.)
6. The first rotor chamber (maid) should be larger than the immediate following chambers. (Typically 15% to 35% of the mother chamber volume, for an Otto-like cycle and 5% to 10%, for a Diesel-like cycle.)
7. The total number of chambers shall be as large as possible, to maximise the 'n2' effect, commensurate with engine size and minimising heat loss. (Typical total count is 20 to 40)
8. Flame lengths for the first chambers of the rotor and stator should be as short as practical. (Typically the maid depth is 40% of the mother depth for an Otto-like cycle and 20% for a Diesel-like cycle)
9. Chambers in both the rotor and stator, except for the maid chamber, shall increase in volume in an 'exponential' fashion. (Starting volumes are typically 2% to 5% of the mother chamber volumes)
10. Chamber 'aperture widths' should increase (proportionally) with chamber volumes, (under constant gas velocity conditions).
11. Expansion chambers should have 'cupulets' on gas front facing surfaces, particularly for 'initial' chambers and rotor chambers.
12. Engine revolutions shall be as high as possible to match flame speeds, commensurate with rotor material tensile strength. (Maximum rpm is typically between 20,000 and 50,000)
13. The angle of incidence of the chamber nozzles should be as close to zero as possible. (Typical ranges is 10 to 20 degrees)

14. Gap dimensions between stator and rotor should be as small as is commensurate with engine lubrication and stability. (Typically 0.005 to 0.03 mm)

Performance Table:

A typical design performance table is given in FIG. 64 (Table 2). This table relates to the Otto-like engine configuration in FIGS. 1 & 7 in the main body of this application. The engine output of turbine is of 1.2 litre capacity for a single module core. Generally all rules of design stated above have been applied to this engine.

Specific Points of Interest are as Follows:
1. The high speed of rotation of the engine of 30,000 rpm (rule 12).
2. The high maximum specific shaft output of 1.0 megawatts (1340 BHP). Double this for a two-core module of 2.4 litres capacity.
3. The total possible engine output of 1.4 megawatts, when turbo assistance is applied. Double this for a two core module of 2.4 litres capacity.
4. The designed mechanical efficiency improvement of nearly 34% (rule 13).
5. The compression ratio (non turbo-charged) of 9.12:1 (rule 1).
6. The expansion ratio of 12:1 giving an 'over ratio' of 1.32 (rule 2).
7. The high power to weight ratio of 47.8 KW per Kg (29 BHP per lb).
8. The operating temperature of 200° C. (rule 3).
9. The take up and tick over rates of 2,000 and 5,000 rpm respectively.
10. The number of chambers is including power exhausts is 28 (rule 6).

What is claimed is:

1. An engine including a combustion assembly comprising a rotor and a stator, in which a combustion chamber is defined in the stator and a fluid receiving chamber is defined in the rotor, in which combustion gas can expand from the combustion chamber into the receiving chamber, whereby momentum is transferred from the combustion gas to the rotor, in which the rotor has a plurality of rotor expansion chambers of successively increasing volumes into which combustion gas can expand in turn, and the stator has a plurality of stator expansion chambers of successively increasing volumes into which gas can expand from the chambers of the rotor.

2. An engine according to claim 1 in which the receiving chamber is of a volume larger than several of the rotor expansion chambers.

3. An engine according to claim 1, in which the rotor has a transfer chamber through which combustion gas can pass into the combustion chamber during a portion of the rotation of the rotor.

4. An engine according to claim 1, in which there is provided spark ignition apparatus in association with the combustion chamber for igniting a charge of combustible fluid received therein.

5. An engine according to claim 4 in which the ignition apparatus includes a spark plug.

6. An engine according to claim 1, in which either one or both of the rotor and stator is formed from a material that has self-lubricating properties.

7. An engine according to claim 6 in which either the rotor or the stator are formed from spheroidal graphite iron.

8. An engine according to claim 1, having an oil mist injector operative to inject an oil mist into a space between the rotor and the stator.

9. An engine according to claim 8 in which the oil mist is injected at a position in advance of the combustion chamber.

10. An engine according to claim 1, having a lubricating brush to add lubricating material between the stator and the rotor.

11. An engine according to claim 10 in which the lubricating material is graphite.

12. An engine according to claim 1, in which the rotor is shaped as a disc having chambers opening to the periphery of the disc.

13. An engine according to claim 1, in which the rotor comprises a rotor assembly that includes a rotor casting.

14. An engine according to claim 12 in which the rotor casting is shaped as a disc, having peripheral openings into voids formed therein.

15. An engine according to claim 14 in which the rotor assembly further comprises end plates secured to the rotor casting to close these voids axially.

16. An engine according to claim 13 including several rotor castings assembled together between endplates to provide a combustion assembly of greater combustion capacity.

17. An engine according to claim 16 in which a spacer is disposed between adjacent rotor castings to aid in removal of heat from the combustion assembly, and from the rotor castings in particular.

18. An engine according to claim 17 in which the spacer includes a through passage in alignment with cooling fluid ducts of the rotor castings.

19. An engine according to claim 1, in which the stator comprises a stator assembly that includes a stator casting.

20. An engine according to claim 19 in which the stator casting is shaped as to partially surround the rotor assembly, having openings into voids formed therein.

21. An engine according to claim 20 in which the stator assembly further comprises end plates secured to the stator casting to close these voids axially.

22. An engine according to claim 21 in which several stator castings may be assembled together between endplates to provide a combustion assembly of greater combustion capacity.

23. An engine according to claim 22 in which a spacer is disposed between adjacent stator castings to aid in removal of heat from the combustion assembly, and from the stator castings in particular.

24. An engine according to claim 23 in which the spacer is formed with holes to link the combustion chambers of the various stator castings in an axial direction.

25. An engine according to claim 1, having a gap control system for controlling a separation between the rotor and the stator during operation of the engine.

26. An engine according to claim 25 in which the-gap control system operates to move the stator radially with respect to the rotor.

27. An engine according to claim 1, in which the rotor is shaped as a frustum, having chambers opening to its periphery.

28. An engine according to claim 27 in which the stator partially surrounds the rotor.

29. An engine according to claim 27 having a gap control system for controlling a separation between the rotor and the stator during operation of the engine.

30. An engine according to claim 29 in which the gap control system operates to move the stator axially with respect to the rotor.

31. An engine according to claim 25, in which the gap control system includes a non-contact sensor.

32. An engine according to claim 31 in which the sensor operates by capacitive sensing, inductive sensing or a combination of capacitive and inductive sensing.

33. An engine according to claim 1, in which the rotor and stator are both disc shaped, the combustion chamber being defined between flat faces of the rotor and the stator.

34. An engine according to claim 1, further including a compressor for supplying combustion air to the combustion assembly.

35. An engine according to claim 34 in which the compressor is driven by the rotor.

36. An engine according to claim 35 in which the compressor and the rotor are carried on a common shaft or upon interconnected coaxial shafts.

37. An engine according to claim 34 in which, in a spark ignition configuration, the compressor delivers combustion air at a pressure in the range of 4 to 7 Bar, and in a compression ignition configuration, the compressor delivers combustion air at a pressure in the range of 9 to 15 Bar.

38. An engine according to claim 34 in which an intercooler is disposed between the compressor and the combustion assembly operative to remove heat from the combustion air.

39. An engine according to claim 33 in which, in a spark ignition configuration, the compressor delivers combustion air at a pressure in the range of 6 to 12 Bar, and in a compression ignition configuration, the compressor delivers combustion air at a pressure in the range of 20 to 30 Bar.

40. An engine according to claim 1, in which fuel is injected into a stream of combustion air externally of the combustion assembly.

41. An engine according to claim 1, in which fuel is injected into a chamber within the combustion assembly.

42. An engine according to claim 1, in which water is introduced into the combustion chamber together with air and fuel.

43. An engine according to claim 42 in which, during combustion, the water vaporises and expands into the receiving chamber and transfers at least some of its momentum to the rotor.

44. An engine according to claim 1, in which the stator and/or the rotor includes a casting between end plates.

* * * * *